(12) United States Patent
Hong et al.

(10) Patent No.: US 11,183,681 B2
(45) Date of Patent: Nov. 23, 2021

(54) COMPOSITE CATHODE ACTIVE MATERIAL, CATHODE AND LITHIUM BATTERY EACH INCLUDING THE SAME, AND METHOD OF PREPARING COMPOSITE CATHODE ACTIVE MATERIAL

(71) Applicants: SAMSUNG ELECTRONICS CO., LTD., Suwon-si (KR); Samsung SDI Co., Ltd., Yongin-si (KR)

(72) Inventors: Sukgi Hong, Seongnam-si (KR); Dongwook Shin, Suwon-si (KR); Byongyong Yu, Suwon-si (KR); Jinhwan Park, Seoul (KR); Jayhyok Song, Suwon-si (KR); Donghee Yeon, Seoul (KR); Byungjin Choi, Seoul (KR); Jinsu Ha, Seongnam-si (KR); Dongjin Ham, Anyang-si (KR)

(73) Assignees: SAMSUNG ELECTRONICS CO., LTD., Gyeonggi-Do (KR); SAMSUNG SDI CO., LTD., Gyeonggi-Do (KR)

( * ) Notice: Subject to any disclaimer, the term of this patent is extended or adjusted under 35 U.S.C. 154(b) by 0 days.

(21) Appl. No.: 16/504,747

(22) Filed: Jul. 8, 2019

(65) Prior Publication Data

US 2020/0136126 A1 Apr. 30, 2020

(30) Foreign Application Priority Data

Oct. 25, 2018 (KR) .................. 10-2018-0128324

(51) Int. Cl.
*H01M 4/131* (2010.01)
*H01M 4/505* (2010.01)
(Continued)

(52) U.S. Cl.
CPC ............ *H01M 4/131* (2013.01); *H01M 4/139* (2013.01); *H01M 4/505* (2013.01); *H01M 4/525* (2013.01)

(58) Field of Classification Search
CPC ...... H01M 4/131; H01M 4/505; H01M 4/525; H01M 4/139
See application file for complete search history.

(56) References Cited

U.S. PATENT DOCUMENTS 6,756,155 B1 * 6/2004 Kweon ................. H01M 4/58
429/231.95
9,209,482 B2 12/2015 Chu et al.
(Continued)

FOREIGN PATENT DOCUMENTS

EP 3632851 A1 4/2020
EP 3693341 A1 8/2020
(Continued)

OTHER PUBLICATIONS

Extended European search report issued by the European Patent Office dated Nov. 26, 2019 in the examination of the European Patent Application No. 19184174.1, which corresponds to U.S. Appl. No. 16/504,747.
(Continued)

*Primary Examiner* — Kenneth J Douyette
(74) *Attorney, Agent, or Firm* — Cantor Colburn LLP

(57) ABSTRACT

A composite cathode active material includes a secondary particle; and a coating on a surface of the secondary particle, wherein the secondary particle comprises a plurality of primary particles, and the plurality of primary particles include a lithium nickel transition metal oxide having a layered crystal structure; and a grain boundary between primary particles of the plurality of primary particles, the grain boundary including a lithium metal oxide having a crystal structure different from the lithium nickel transition
(Continued)

metal oxide having a layered crystal structure, wherein the coating on the surface of the secondary particle includes a metal oxide including cobalt, and a Group 2 element, a Group 12 element, a Group 13 element, or a combination thereof.

29 Claims, 10 Drawing Sheets

(51) Int. Cl.
*H01M 4/525* (2010.01)
*H01M 4/139* (2010.01)

(56) References Cited

U.S. PATENT DOCUMENTS

| | | |
|---|---|---|
| 2005/0260495 A1 | 11/2005 | Onnerud et al. |
| 2011/0136013 A1 | 6/2011 | Liu et al. |
| 2012/0034503 A1 | 2/2012 | Toyama et al. |
| 2012/0231322 A1* | 9/2012 | Chu .................. H01M 4/38 429/144 |
| 2014/0197357 A1* | 7/2014 | Ofer ................ H01M 10/0525 252/182.1 |
| 2015/0171423 A1 | 6/2015 | Kim et al. |
| 2015/0357638 A1* | 12/2015 | Sun ................ H01M 4/366 429/219 |
| 2016/0276658 A1 | 9/2016 | Choi et al. |
| 2017/0194637 A1 | 7/2017 | Ahn et al. |
| 2020/0112024 A1 | 4/2020 | Shin et al. |
| 2020/0136132 A1 | 4/2020 | Hong et al. |

FOREIGN PATENT DOCUMENTS

| | | |
|---|---|---|
| JP | 2016081903 A | 5/2016 |
| KR | 101066185 B1 | 9/2011 |
| KR | 20150063956 A | 6/2015 |
| KR | 101785265 B1 | 10/2017 |
| KR | 101810574 B1 | 12/2017 |
| WO | 2018003439 A1 | 1/2018 |

OTHER PUBLICATIONS

J.-S. Kim et al., "Layered xLiMO2-(1—x)Li2M'O3 electrodes for lithium batteries: a study of 0.95LiMn0.5Ni0.5O2·0.05Li2TiO3," Electrochemistry Communications, 2002, pp. 205-209, vol. 4.
EP European Communication pursuant to Article 94(3)EPC for European Patent Application No. 19 184 174.1 dated Jan. 12, 2021.

* cited by examiner

COMPOSITE CATHODE ACTIVE MATERIAL, CATHODE AND LITHIUM BATTERY EACH INCLUDING THE SAME, AND METHOD OF PREPARING COMPOSITE CATHODE ACTIVE MATERIAL

CROSS-REFERENCE TO RELATED APPLICATION

This application claims priority to and the benefit of Korean Patent Application No. 10-2018-0128324, filed on Oct. 25, 2018, in the Korean Intellectual Property Office, and all the benefits accruing therefrom under 35 U.S.C. § 119, the content of which is incorporated herein in its entirety by reference.

BACKGROUND

1. Field

The present disclosure relates to a composite cathode active material, a cathode, and lithium battery, each including the same, and methods of preparing the composite cathode active material.

2. Description of the Related Art

For improved miniaturization and performance of various devices, high energy density, in addition to miniaturization and weight reduction of lithium batteries is becoming important. For the implementation of lithium batteries that satisfy such importance, nickel-based cathode active materials having high capacity are being studied.

Existing nickel-based cathode active materials exhibit deteriorated lifespan characteristics and are unable to provide satisfactory thermal stability due to a large amount of lithium remaining on surfaces of the active material, and side reactions caused by cation mixing. Therefore, there is a need for a nickel-based cathode active material that is effective in preventing the deterioration of battery performance.

SUMMARY

Provided is a composite cathode active material capable of effectively preventing deterioration of battery performance.

Provided is a cathode including the composite cathode active material.

Provided is a lithium battery including the cathode.

Provided are methods of preparing the composite cathode active materials.

Additional aspects will be set forth in part in the description which follows and, in part, will be apparent from the description, or may be learned by practice of the presented embodiments.

According to an aspect of an embodiment, a composite cathode active material includes: a secondary particle; and a coating on a surface of the secondary particle, wherein the secondary particle includes a plurality of primary particles, and wherein the plurality of primary particles includes a lithium nickel transition metal oxide having a layered crystal structure; and a grain boundary between primary particles of the plurality of primary particles, the grain boundary including a lithium metal oxide having a crystal structure different from the lithium nickel transition metal oxide having a layered crystal structure and represented by Formula 1, wherein the coating on the surface of the secondary particle includes a metal oxide includes cobalt, and a Group 2 element, a Group 12 element, a Group 13 element, or a combination thereof, $$Li_aM1_bO_c \quad \text{Formula 1}$$

wherein, in Formula 1, M1 is zirconium, manganese, silicon, molybdenum, palladium, Co, nickel, titanium, tin, iridium, platinum, aluminum, ruthenium, or a combination thereof, and wherein $1.9 \leq a \leq 4$, $0.9 \leq b \leq 1.1$, and $2.95 \leq c \leq 4$.

According to an aspect of an embodiment, a cathode includes the composite cathode active material.

According to an aspect of an embodiment, a lithium battery includes the cathode.

According to an aspect of an embodiment, a method of preparing a composite cathode active material includes: mixing a lithium nickel transition metal oxide having a layered crystal structure and a precursor of a metal oxide to obtain a composite cathode active material composition; and heat-treating the composite cathode active material composition in an oxidative atmosphere at a temperature of about 400° C. to about 1,000° C. to prepare the composite cathode active material.

The lithium nickel transition metal oxide having a layered crystal structure may be prepared using a method including: mixing a precursor of a lithium nickel transition metal oxide having a layered crystal structure with a precursor of the compound represented by Formula 1 to prepare a mixture; and heat-treating the mixture in an oxidative atmosphere at a temperature of about 400° C. to about 1,000° C.

BRIEF DESCRIPTION OF THE DRAWINGS

These and/or other aspects will become apparent and more readily appreciated from the following description of the embodiments, taken in conjunction with the accompanying drawings in which.

DETAILED DESCRIPTION

Figure 1:
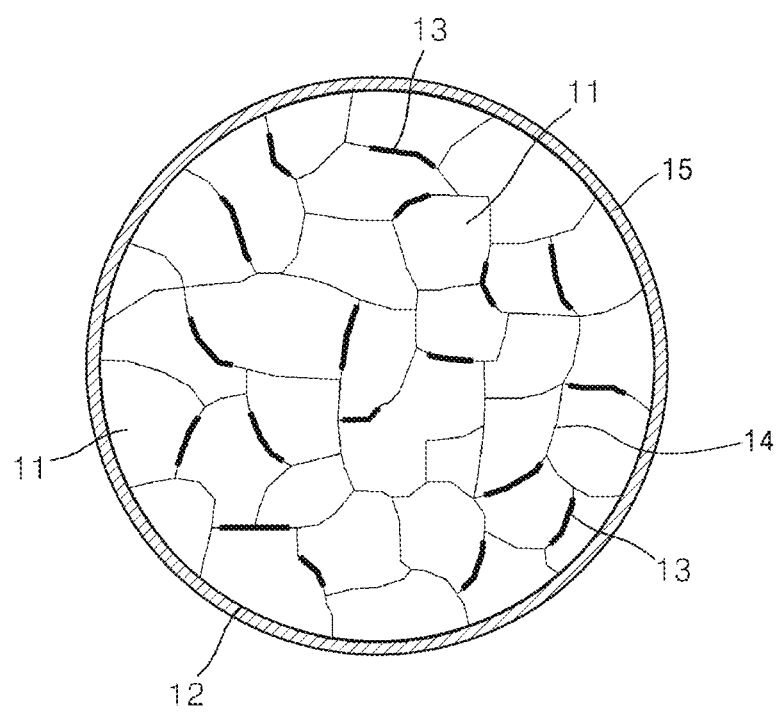
FIG. 1 is a schematic view illustrating an embodiment of a structure of a composite cathode active material.

Reference will now be made in detail to embodiments, examples of which are illustrated in the accompanying drawings, wherein like reference numerals refer to like elements throughout. In this regard, the present embodiments may have different forms and should not be construed as being limited to the descriptions set forth herein. Accordingly, the embodiments are merely described below, by referring to the figures, to explain aspects. As used herein, the term "and/or" includes any and all combinations of one or more of the associated listed items. Expressions such as "at least one of," when preceding a list of elements, modify the entire list of elements and do not modify the individual elements of the list.

It will be understood that when an element is referred to as being "on" another element, it can be directly on the other element or intervening elements may be present therebetween. In contrast, when an element is referred to as being "directly on" another element, there are no intervening elements present.

It will be understood that, although the terms "first," "second," "third," etc. may be used herein to describe various elements, components, regions, layers, and/or sections, these elements, components, regions, layers, and/or sections should not be limited by these terms. These terms are only used to distinguish one element, component, region, layer, or section from another element, component, region, layer, or section. Thus, "a first element," "component," "region," "layer," or "section" discussed below could be termed a second element, component, region, layer, or section without departing from the teachings herein.

It will be understood that the terms "comprises" and/or "comprising," or "includes" and/or "including" when used in this specification, specify the presence of stated features, regions, integers, steps, operations, elements, and/or components, but do not preclude the presence or addition of one or more other features, regions, integers, steps, operations, elements, components, and/or groups thereof.

"About" as used herein is inclusive of the stated value and means within an acceptable range of deviation for the particular value as determined by one of ordinary skill in the art, considering the measurement in question and the error associated with measurement of the particular quantity (i.e., the limitations of the measurement system). For example, "about" can mean within one or more standard deviations, or within ±30%, 20%, 10% or 5% of the stated value.

Unless otherwise defined, all terms (including technical and scientific terms) used herein have the same meaning as commonly understood by one of ordinary skill in the art to which this disclosure belongs. It will be further understood that terms, such as those defined in commonly used dictionaries, should be interpreted as having a meaning that is consistent with their meaning in the context of the relevant art and the present disclosure, and will not be interpreted in an idealized or overly formal sense unless expressly so defined herein.

Exemplary embodiments are described herein with reference to cross section illustrations that are schematic illustrations of idealized embodiments. As such, variations from the shapes of the illustrations as a result, for example, of manufacturing techniques and/or tolerances, are to be expected. Thus, embodiments described herein should not be construed as limited to the particular shapes of regions as illustrated herein but are to include deviations in shapes that result, for example, from manufacturing. For example, a region illustrated or described as flat may, typically, have rough and/or nonlinear features. Moreover, sharp angles that are illustrated may be rounded. Thus, the regions illustrated in the figures are schematic in nature and their shapes are not intended to illustrate the precise shape of a region and are not intended to limit the scope of the present claims.

A C rate means a current which will discharge a battery in one hour, e.g., a C rate for a battery having a discharge capacity of 1.6 ampere-hours would be 1.6 amperes.

Hereinafter, a composite cathode active material according to an embodiment, a method of preparing the composite cathode active material, and a lithium battery including the composite cathode active material will be described in more detail.

A composite cathode active material according to an embodiment of the present disclosure includes a secondary particle comprising a plurality of primary particles and a coating film (e.g., coating) on a surface of the secondary particle, wherein the primary particles include a nickel-based lithium nickel transition metal oxide having a layered crystal structure, a grain boundary between the primary particles includes a lithium metal oxide having a crystal structure different from the lithium nickel transition metal oxide and represented by Formula 1 below, and the coating film on the surface of the secondary particle includes a metal oxide including cobalt (Co) and a Group 2 element, a Group 12 element, a Group 13 element, or a combination thereof:

$$Li_aM1_bO_c \qquad \text{Formula 1}$$

wherein, in Formula 1, M1 is zirconium (Zr), manganese (Mn), silicon (Si), molybdenum (Mo), palladium (Pd), Co, nickel (Ni), titanium (Ti), tin (Sn), iridium (Ir), platinum (Pt), aluminum (Al), ruthenium (Ru), or a combination thereof, 1.9≤a≤4, 0.9≤b≤1.1, and 2.9≤c≤4.

The lithium metal oxide represented by Formula 1 has a monoclinic crystal structure, and may be, for example, $Li_2ZrO_3$, $Li_2TiO_3$, $Li_4SiO_4$, $Li_2SiO_3$, or a combination thereof.

In the metal oxide including Co and a Group 2 element, a Group 12 element, a Group 13 element, or a combination thereof, which is included in the coating film arranged on the surface of the secondary particle, the Group 2 element may be, for example, magnesium (Mg), calcium (Ca), strontium (Sr), barium (Ba), or a combination thereof. The Group 12 element may be, for example, zinc, and the Group 13 element may be, for example, aluminum, gallium, indium, thallium, or a combination thereof.

A cobalt composite oxide including the metal oxide comprising Co and a Group 2 element, a Group 12 element, a Group 13 element, or a combination thereof may be a compound represented by Formula 2:

$$Li_xCo_aMe_bO_c \qquad \text{Formula 2}$$

wherein, in Formula 2, Me is a Group 2 element, a Group 12 element, a Group 13 element, or a combination thereof, 0≤x≤1.1, 0<a≤3, 0<b≤3, and 1≤c≤4.1.

As can be seen in Formula 2, when x=0, the cobalt composite oxide including Co and a Group 2 element, a Group 12 element, a Group 13 element, or a combination thereof does not contain lithium.

Formula 2 above may be understood to be a composition formula (empirical formula) including the elements shown in Formula 2.

According to an embodiment, the metal oxide cobalt, and the at least one selected from a Group 2 element, a Group 12 element, a Group 13 element, or a combination thereof may be $Co_3O_4$, MgO, $Li_xCoO_2$ where $0<x\leq1.5$, or a combination thereof, and the metal oxide may be, for example, a mixture of $Co_3O_4$ and MgO, a $Co_3O_4 \cdot MgO$ composite, a mixture of $LiCoO_2$ and MgO, a $LiCoO_2 \cdot MgO$ composite, a mixture of $LiCoO_2$ and $Co_3O_4$, a $LiCoO_2 \cdot C_3O_4$ composite, a mixture of $LiCoO_2$, $CO_3O_4$, and MgO, or a $LiCoO_2 \cdot Co_3O_4 \cdot MgO$ composite.

In Formula 2, x is, for example, 0 to 1.09, 0.01 to 1.09, or 0.1 to 1.05, a is 1 to 3, b is 1 to 3, and c is 4 or 1.9 to 4.

In Formula 2, Me is aluminum (Al), gallium (Ga), magnesium (Mg), calcium (Ca), barium (Ba), zinc (Zn), or a combination thereof.

The compound of Formula 2 is, for example, $Li_xCo_aAl_bO_4$, $Li_xCo_aZn_bO_4$, $Li_xCo_aMg_bO_4$, $Li_xCo_aGa_bO_4$, $Li_xCo_aCa_bO_4$, or $Li_xCo_aBa_bO_4$, wherein $1 \leq x \leq 1.1$, $0<a<2$, $0<b<2$, and $0<a+b\leq 2$, e.g., $1 \leq x \leq 1.1$, $0.2<a<1.9$, $0.2<b<1.9$, and $0<a+b\leq 2$. In an embodiment, a is less than b, and in an embodiment, a greater than b.

The compound of Formula 2 is, for example, $LiCo_{1.5}Al_{0.5}O_4$, $LiCo_{1.5}Ga_{0.5}O_4$, $LiCo_{1.33}Ga_{0.67}O_4$, $LiCo_{1.33}Ca_{0.67}O_4$, $LiCo_{1.33}Ba_{0.67}O_4$, $LiCo_{1.33}Zn_{0.67}O_4$, $LiCo_{1.2}Mg_{0.8}O_4$, $LiCo_{1.2}Ga_{0.8}O_4$, $LiCo_{1.2}Ca_{0.8}O_4$, $LiCo_{1.2}Ba_8O_4$, $LiCo_{1.2}Zn_{0.8}O_4$, $LiCo_{1.6}Mg_{0.4}O_4$, $LiCo_{1.6}Ga_{0.4}O_4$, $LiCo_{1.6}Ca_{0.4}O_4$, $LiCo_{1.6}Ba_{0.4}O_4$, $LiCo_{1.6}Zn_{0.4}O_4$, $LiCo_{0.8}Mg_{1.2}O_4$, $LiCo_{0.8}Ga_{1.2}O_4$, $LiCo_{0.8}Ca_{1.2}O_4$, $LiCo_{0.8}Ba_{1.2}O_4$, $LiCo_{0.8}Zn_{1.2}O_4$, $LiCo_{0.4}Mg_{1.6}O_4$, $LiCo_{0.4}Ga_{1.6}O_4$, $LiCo_{0.4}Ca_{1.6}O_4$, $LiCo_{0.4}Ba_{1.6}O_4$, or $LiCo_{0.4}Zn_{1.6}O_4$.

The compound of Formula 2 is, for example, $LiCo_{1.5}Al_{0.5}O_4$, $LiCo_{1.33}Zn_{0.67}O_4$, $LiCo_{1.2}Mg_{0.8}O_4$, $LiCo_{1.6}Mg_{0.4}O_4$, $LiCo_{0.8}Mg_{1.2}O_4$, or $LiCo_{0.4}Mg_{1.6}O_4$.

The lithium nickel transition metal oxide having a layered crystal structure has a rock-salt layered crystal structure (e.g., having a R-3m space group), and the lithium cobalt composite oxide, which has a spinel crystal structure and includes Co and a Group 2 element, a Group 12 element, a Group 13 element, or a combination thereof, may belong to the Fd-3m space group. A lithium battery including the composite cathode active material having the disclosed crystal structure may exhibit further enhanced cycle characteristics and thermal stability. While not wanting to be bound by theory, it is understood that cations in the rock-salt layered crystal structure are disordered, resulting in improved charge and discharge stability.

The term "grain boundary" as used herein refers to an interface between adjacent (neighboring) primary particles. The grain boundary, i.e., the interface between the adjacent and neighboring primary particles, is present inside the secondary particle.

The term "primary particles" refers to individual particles, which can agglomerate with each other to form the secondary particle, and may have various shapes such as a rod shape and a tetragonal shape, and the term "secondary particle" as used herein refers to a particle that includes a plurality of primary particles and is not an aggregate of other particles or is not agglomerated any further, and the secondary particle may have a spherical shape.

FIG. 1 is a conceptual cross-sectional view illustrating a detailed structure of a secondary particle 12 in a composite cathode active material according to an embodiment.

Referring to FIG. 1, primary particles 11 are agglomerated with each other to form the secondary particle 12, a grain boundary 14 between adjacent primary particles 11 includes a lithium metal oxide 13, which is represented by Formula 1 above, and a coating film 15 including the metal oxide including Co and a Group 2 element, a Group 12 element, a Group 13 element, or a combination thereof is on a surface of the secondary particle (12).

While not wanting to be bound by theory, it is understood that because a grain boundary between adjacent primary particles includes the lithium metal oxide of Formula 1, lithium ion conduction inside a secondary particle is improved, e.g., so that the secondary particle has reduced concentration polarization, and the elution of nickel ions from the primary particles in the secondary particle to an electrolytic solution that has permeated into the secondary particle is suppressed. In addition, a side reaction of the primary particles in the secondary particle and the electrolytic solution is suppressed. Accordingly, cycle characteristics of a lithium battery including the composite cathode active material are enhanced. In addition, the amount of lithium remaining on surfaces of a plurality of primary particles present in a secondary particle is reduced, and thus deterioration of the composite cathode active material is suppressed, and gas generation is reduced, resulting in enhanced thermal stability of a lithium battery. While not wanting to be bound by theory, it is understood that a composition included in a grain boundary between neighboring primary particles prevents damage to surfaces of the primary particles, which is understood to occur during washing of the composite cathode active material, and thus prevents deterioration of lifespan characteristics of a lithium battery. The composition included in a grain boundary between neighboring primary particles accepts a volumetric change in of primary particles when charged and discharged, and thus suppresses separation between the primary particles, and accordingly, deterioration of mechanical strength of the composite cathode active material is suppressed, even after long-term charging and discharging, thus preventing the deterioration of a lithium battery. In addition, a metal of the metal oxide included in the grain boundary is included, e.g., doped, into the lithium transition metal oxide included in the primary particles, and thus a crystal structure of the lithium nickel transition metal oxide is stabilized, and accordingly, cycle characteristics of a lithium battery including the composite cathode active material are further enhanced.

The lithium metal oxide of Formula 1 may have a structure in a monoclinic crystal system, e.g., a monoclinic crystal structure. The lithium metal oxide of Formula 1 is, for example, $Li_2ZrO_3$, $Li_2TiO_3$, $Li_4SiO_4$, $Li_2SiO_3$, or a combination thereof.

The metal oxide included in the surface of the secondary particle includes a spinel-structure metal oxide or a spinel-structure metal oxide and a layered crystal structure metal oxide. The metal oxide is, for example, a combination of i) at least one of $Co_3O_4$ and $Li_xCoO_2$ wherein $0<x\leq1.5$, and ii) MgO. The metal oxide having such a composition may be represented by Formula 2. $Li_xCoO_2$ where $0<x\leq1.5$ is, for example, $LiCoO_2$ or $Li_xCoO_2$. In an embodiment, $x\leq1$, e.g., $x<1$, e.g., $0<x\leq1$.

The metal oxide of Formula 2 is a mixture of $Co_3O_4$ and MgO, a $Co_3O_4 \cdot MgO$ composite, a mixture of $LiCoO_2$ and $Co_3O_4$, a $LiCoO_2 \cdot CO_3O_4$ composite, a mixture of $LiCoO_2$, $Co_3O_4$, and MgO, or a $LiCoO_2 \cdot Co_3O_4 \cdot MgO$ composite.

The concentration of the Co and the Group 2 element, the Group 12 element, the Group 13 element, or the combination thereof may be greater in the coating film than in the secondary particle. In the coating film, the concentrations of the Co and the Group 2 element, the Group 12 element, the Group 13 element, or the combination thereof may increase with increasing distance away from the surface of the secondary particle.

Hereinafter, a theoretical basis that the composite cathode active material according to an embodiment provides is be described, but this is provided to aid in understanding of the present disclosure and is not intended to limit the scope of this disclosure in any way.

To suppress the elution of nickel ions from the secondary particle into an electrolytic solution, for example, the lithium metal oxide of Formula 1 is included in the grain boundary between neighboring primary particles of the composite cathode active material. Through heat treatment performed in a process of preparing a lithium metal oxide, a metal included in the secondary particle is intermixed with a metal of the lithium metal oxide, and thus the elution of nickel ions from the secondary particle into the electrolytic solution is suppressed. In addition, in a process of forming the coating film on the surface of the secondary particle, a precursor of the metal oxide including Co and a Group 2 element, a Group 12 element, a Group 13 element, or a combination thereof is reacted with lithium remaining on the secondary particle, and thus the amount of lithium remaining on the surface of the composite cathode active material is reduced. The coating film formed on the surface of the secondary particle acts as a protective film, and a Co-containing phase, such as $LiCoO_2$, in the coating film contributes to enhancement of capacity of a battery and is mixed with a stable phase such as MgO or forms a composite, thereby forming a coating film. In the process of forming an MgO coating film on the surface of the secondary particle, Mg is disposed at the grain boundaries of the primary particles by diffusion, thereby contributing to structural stabilization of the composite cathode active material. Accordingly, for example, and while not wanting to be bound by theory, it is understood that a side reaction between the composite cathode active material and an electrolytic solution and gas generation are effectively suppressed. Consequently, the cycle characteristics and thermal stability of a lithium battery including the composite cathode active material are enhanced.

According to an embodiment, during heat-treatment of the nickel-based lithium nickel transition metal oxide having a layered crystal structure and a precursor of the metal oxide including Co and a Group 2 element, a Group 12 element, a Group 13 element, or a combination thereof, e.g., a cobalt hydroxide, magnesium (Mg) and aluminum (Al) may diffuse into particles of the nickel-based lithium nickel transition metal oxide having a layered crystal structure, thereby forming $MgAl_2O_4$. Here, the particles may be secondary particle or primary particle.

$MgAl_2O_4$ may be obtained by reacting Mg of magnesium nitrate, which is used in forming the coating film on the surface of the secondary particle, with Al of the nickel-based lithium nickel transition metal oxide having a layered crystal structure. In addition to $MgAl_2O_4$, for example, a gallium aluminum oxide, a barium aluminum oxide, a zinc aluminum compound, or the like may also be formed inside the particles of the nickel-based lithium nickel transition metal oxide having a layered crystal structure.

The metal oxide may be $Li_xCo_aMg_bO_4$, $Li_xCo_aCa_bO_4$, $Li_xCo_aBa_bO_4$, $Li_xCo_aZn_bO_4$, $Li_xCo_aAl_bO_4$, or $Li_xCo_aGa_bO_4$, wherein $1 \leq x \leq 1.1$, $0<a<2$, $0<b<2$, and $0<a+b \leq 2$.

The nickel-based lithium nickel transition metal oxide having a layered crystal structure has a rock-salt layered crystal structure, may belong to the R-3m space group, and the lithium cobalt composite oxide is a composite cathode active material and may belong to the Fd-3m space group.

The coating film has a thickness of 1 micrometer (μm) or less, for example, about 0.01 nanometer (nm) to about 900 nm; 500 nanometers (nm) or less, for example, about 0.1 nm to about 400 nm; 100 nm or less, for example, about 0.5 nm to about 90 nm; or 50 nm or less, for example, about 1 nm to about 40 nm.

The lithium nickel transition metal oxide having a layered crystal structure may be doped with Al, Zr, or a combination thereof.

The lithium nickel transition metal oxide having a layered crystal structure may be, for example, a compound represented by Formula 3:

$$Li_aM2O_{2-\alpha}X_\alpha \qquad \text{Formula 3}$$

wherein, in Formula 3, $0.9 \leq a \leq 1.1$, $0 \leq \alpha < 2$, and M2 is nickel (Ni) and at least two elements of Groups 2 to 13 elements except for Ni, X is F, Cl, Br, S, or P, and a nickel content in M2 ranges from about 70 mole percent (mol %) to less than about 100 mol %, based on a total content of M2 in the compound of Formula 3.

The compound of Formula 3 may include a metal of the lithium metal oxide present in the grain boundary.

The lithium nickel transition metal oxide having a layered crystal structure may be a compound represented by Formula 4 below:

$$Li_aNi_bM2_cM3_dM4_eO_{2-\alpha}X_\alpha \qquad \text{Formula 4}$$

wherein, in Formula 4, $0.9 \leq a \leq 1.1$, $0.7 < b < 1$, $0 < c < 0.3$, $0 < d < 0.3$, $0 \leq e < 0.1$, $b+c+d+e=1$, and $0 \leq \alpha < 2$,
M2, M3, and M4 are different from one another and are each independently Co, Mn, Al, Zr, rhenium (Re), vanadium (V), chromium (Cr), iron (Fe), boron (B), ruthenium (Ru), titanium (Ti), niobium (Nb), molybdenum (Mo), Mg, Pt, or a combination thereof, and X is F, Cl, Br, S, or P.

The lithium nickel transition metal oxide having a layered crystal structure may be a compound represented by Formula 5, a compound represented by Formula 6, or a combination thereof:

$$Li_aNi_bCO_cMn_dM5_eO_{2-\alpha}X_\alpha \qquad \text{Formula 5}$$

$$Li_aNi_bCO_cAl_dM5_eO_{2-\alpha}X_\alpha \qquad \text{Formula 6}$$

wherein, in Formulae 5 and 6, a, b, c, d, e, and α are each independently $0.9 \leq a \leq 1.1$, $0.7 < b < 1$, $0 < c < 0.2$, $0 < d < 0.2$, $0 \leq e < 0.01$, $b+c+d+e=1$, $0 \leq \alpha < 2$, M5 is Zr, Al, V, Cr, Fe, Re, B, Ru, Ti, Nb, Mo, Mg, or Pt, and X is F, Cl, Br, S, or P.

The lithium nickel transition metal oxide having a layered crystal structure may comprise, for example, a second layered structure crystal phase that has a composition represented by Formula 7a and may belong to a C2/m space group, and a third phase having a layered structure crystal that has a composition represented by Formula 7b and may belong to an R-3m space group.

$$Li_2MnO_3 \qquad \text{Formula 7a}$$

$$LiMO_2 \qquad \text{Formula 7b}$$

wherein, in Formula 7b, M includes Ni and Co, Mn, V, Cr, Fe, Zr, Re, Al, B, Ru, Ti, Nb, Mo, Mg, Pt, or a combination thereof.

At least a part of M is Ni. The amount of Ni in M may be 70 mol % or greater, for example, 70 mol % to 99 mol %, or 75 mol % to 95 mol %, based on a total content of M in the compound of Formula 7b. The second layered structure crystal phase represented by Formula 7b may comprise, for example, a doped metal.

The lithium nickel transition metal oxide having a layered crystal structure may be a compound represented by Formula 7:

$$aLi_2MnO_3 \cdot (1-a)LiM_6O_{2-\alpha}X_\alpha \qquad \text{Formula 7}$$

wherein, in Formula 7, 0<a<1, 0≤α<2, $M_6$ includes Ni and Co, Mn, Zr, Al, Re, V, Cr, Fe, B, Ru, Ti, Nb, Mo, Mg, Pt, or a combination thereof, and X is F, Cl, Br, S, or P.

A secondary particle including the lithium nickel transition metal oxide having a layered crystal structure may have an average particle diameter of about 1 μm to about 40 μm, or about 10 μm to about 20 μm. The lithium nickel transition metal oxide having a layered crystal structure may be a compound represented by Formula 8 or 9:

$$Li_xNi_{1-y-z}Mn_zCo_yO_2 \quad \text{Formula 8}$$

wherein, in Formula 8, 0.8≤x≤1.1, 0≤y≤0.2, 0≤z≤0.2, and 0.85≤1-y-z≤0.99, $$Li_xNi_{1-y-z}Al_zCo_yO_2 \quad \text{Formula 9}$$

wherein, in Formula 9, 0.8≤x≤1.1, 0≤y≤0.2, 0≤z≤0.2, and 0.85≤1-y-z≤0.99.

The term "average particle diameter", as used herein, refers to a particle diameter corresponding to 50% of the particles in a distribution curve in which particles are accumulated in the order of particle diameter from the smallest particle to the largest particle. Here, the total number of accumulated particles is 100%. The average particle diameter may be measured by methods known to one of ordinary skill in the art. For example, the average particle diameter may be measured with a particle size analyzer (Beckman Coulter LS13 320) or measured by using a transmission electron microscope (TEM) or a scanning electron microscope (SEM) image. As an example of other measuring methods, the average particle diameter may be measured with a measurement device using dynamic light scattering. According to this method, the number of particles within predetermined size ranges may be counted, and an average particle diameter may be calculated therefrom.

Examples of the lithium nickel transition metal oxide having a layered crystal structure include $Li_{1.03}(Ni_{0.91}Co_{0.06}Mn_{0.03})O_2$, $Li_{1.03}(Ni_{0.88}Co_{0.08}Mn_{0.04})O_2$, $Li_{1.03}(Ni_{0.8}Co_{0.15}Mn_{0.05})O_2$, $Li_{1.03}(Ni_{0.85}Co_{0.10}Mn_{0.05})O_2$, $Li_{1.03}(Ni_{0.91}Co_{0.05}Mn_{0.04})O_2$, $Li_{1.05}(Ni_{0.91}Co_{0.06}Mn_{0.03})O_2$, $Li_{1.06}(Ni_{0.91}Co_{0.06}Mn_{0.03})O_2$, $Li_{1.06}(Ni_{0.88}Co_{0.08}Mn_{0.04})_2$, $Li_{1.06}(Ni_{0.8}Co_{0.15}Mn_{0.05})O_2$, $Li_{1.06}(Ni_{0.85}Co_{0.10}Mn_{0.05})O_2$, $Li_{1.06}(Ni_{0.91}Co_{0.05}Mn_{0.04})O_2$, $Li_{1.09}(Ni_{0.91}Co_{0.06}Mn_{0.03})O_2$, $Li_{1.09}(Ni_{0.88}Co_{0.08}Mn_{0.04})_2$, $Li_{1.09}(Ni_{0.8}Co_{0.15}Mn_{0.05})O_2$, $Li_{1.09}(Ni_{0.85}Co_{0.10}Mn_{0.05})O_2$, $Li_{1.09}(Ni_{0.91}Co_{0.05}Mn_{0.04})O_2$, $LiNi_{0.91}Co_{0.06}Al_{0.03}O_2$, $LiNi_{0.88}Co_{0.08}Al_{0.04}O_2$, $LiNi_{0.8}Co_{0.15}Al_{0.05}O_2$, $LiNi_{0.85}Co_{0.10}Al_{0.05}O_2$, $LiNi_{0.91}Co_{0.05}Al_{0.04}O_2$, $Li_{1.09}(Ni_{0.88}Co_{0.08}Mn_{0.04})_{0.9963}Al_{0.0012}Zr_{0.0025}O_2$, and $Li_{1.09}(Ni_{0.91}Co_{0.06}Mn_{0.03})_{00.9963}Al_{0.0012}Zr_{0.0025}O_2$.

A total amount of the metal oxide in the coating film ranges from about 0.01 parts by weight to about 20 parts by weight, with respect to 100 parts by weight of the nickel-based lithium nickel transition metal oxide having a layered crystal structure. In addition, in an embodiment, an amount of residual lithium in the composite cathode active material is about 3,000 parts per million (ppm) by weight or greater, e.g., about 4000 ppm to about 10,000 ppm, or about 5000 ppm to about 8,000 ppm before washing, and about 2,000 ppm or less after washing, e.g., about 10 ppm to about 1800 ppm, or about 100 ppm to about 1500 ppm. In addition, the amount of residual lithium in the composite cathode active material is about 90 weight percent (%) or less of the amount of residual lithium in the secondary particle including the lithium nickel transition metal oxide having a layered crystal structure.

The coating film may cover 50% or greater, for example, 50% to 99%, of the surface of the lithium nickel transition metal oxide having a layered crystal structure. By such a structure, a side reaction between the lithium nickel transition metal oxide and an electrolytic solution may be substantially reduced and/or may be effectively minimized or prevented.

According to an embodiment of the present disclosure, there is provided a cathode including the composite cathode active material according to an embodiment.

The cathode may further include an olivine-based cathode active material having an olivine structure. The olivine-based cathode active material may be a compound represented by Formula 10:

$$Li_xM_yM'_{1-y}PO_4 \quad \text{Formula 10}$$

wherein, in Formula 10, 0.1≤x≤2, 0≤y≤1, and M and M' are each independently Fe, Ti, V, Mn, Cr, Co, Ni, copper (Cu), or Zn.

The olivine-based cathode active material may be represented by, for example, Formula 11 below:

$$Li_xM8_yM9_zPO_{4-\alpha}X_\alpha \quad \text{Formula 11}$$

wherein, in Formula 11, 0.9≤x≤1.1, 0≤y≤0.9, 0≤z≤0.5, 1-y-z≥0, 0≤α≤2, M8 is Ti, V, Cr, Mn, Fe, Co, Ni, Cu, Al, Mg, Zr, B, or a combination thereof, M9 is Mg, Ca, Sr, Ba, Ti, Zr, Nb, Mo, tungsten (W), Zn, Al, Si, Ni, Mn, Cr, Fe, V, a rare earth element, or a combination thereof, and X is fluorine (F), chloride (Cl), bromine (Br), sulfur (S), or phosphorus (P).

The olivine-based cathode active material may be, for example, $LiFePO_4$, $LiNiPO_4$, $LiMnPO_4$, or $LiCoPO_4$.

The amount of the olivine-based cathode active material included in the cathode ranges from, for example, about 1 part by weight to about 10 parts by weight, for example, about 1 part by weight to about 7 parts by weight, for example, 1 part by weight to about 5 parts by weight, with respect to 100 parts by weight of a total weight of the cathode active material. Since the cathode further includes the olivine-based cathode active material within the above amount range, cycle characteristics and mass density of a lithium battery may be further enhanced.

A lithium battery according to an embodiment includes the cathode including the composite cathode active material.

Since the lithium battery employs the cathode including the composite cathode active material, enhanced cycle characteristics and thermal stability are provided.

The lithium battery is manufactured using, for example, the following example method, but the present disclosure is not particularly limited thereto, and the method may be modified as desired.

First, a cathode is manufactured according to the following method.

A cathode active material composition, in which a cathode active material, a binder, and a solvent are mixed, is prepared. The cathode active material composition may further include a conductive agent.

The cathode active material composition is coated directly onto a current collector and dried, thereby manufacturing a cathode plate. In an embodiment, the cathode active material composition may be cast onto a separate support, and a film separated from the support may be laminated on a current collector, thereby manufacturing a cathode plate.

As the cathode active material, a composite cathode active material according to an embodiment may be used. In addition to the composite cathode active material, the cathode active material composition may further include a first cathode active material, which is a cathode active material used in a lithium battery.

The first cathode active material may include lithium cobalt oxide, lithium nickel cobalt manganese oxide, lithium nickel cobalt aluminum oxide, lithium iron phosphate, lithium manganese oxide, or a combination thereof, but the present disclosure is not limited thereto, and any suitable cathode active material may be used as the first cathode active material.

For example, the first cathode active material may be a compound represented by any of the following formulae: $Li_aA_{1-b}B'_bD_2$ where $0.90 \leq a \leq 1.8$ and $0 \leq b \leq 0.5$); $Li_aE_{1-b}B'_bO_{2-c}D_c$ where $0.90 \leq a \leq 1.8$, $0 \leq b \leq 0.5$, and $0 \leq c \leq 0.05$; $LiE_{2-b}B'_bO_{4-c}D_c$ where $0 \leq b \leq 0.5$ and $0 \leq c \leq 0.05$; $Li_aNi_{1-b-c}Co_bB'_cD_\alpha$ where $0.90 \leq a \leq 1.8$, $0 \leq b \leq 0.5$, $0 \leq c \leq 0.05$, and $0 \leq \alpha \leq 2$; $Li_aNi_{1-b-c}Co_bB'_cO_{2-\alpha}F'_\alpha$ where $0.90 \leq a \leq 1.8$, $0 \leq b \leq 0.5$, $0 \leq c \leq 0.05$, and $0 < \alpha < 2$; $Li_aNi_{1-b-c}Mn_bB'_cD_\alpha$ where $0.90 \leq a \leq 1.8$, $0 \leq b \leq 0.5$, $0 \leq c \leq 0.05$, and $0 < \alpha \leq 2$; $Li_aNi_{1-b-c}Mn_bB'_cO_{2-\alpha}F'_\alpha$ where $0.90 \leq a \leq 1.8$, $0 \leq b \leq 0.5$, $0 \leq c \leq 0.05$, and $0 < \alpha < 2$; $Li_aNi_bE_cG_dO_2$ where $0.90 \leq a \leq 1.8$, $0 \leq b \leq 0.9$, $0 \leq c \leq 0.5$, and $0.001 \leq d \leq 0.1$; $Li_aNi_bCo_cMn_dGeO_2$ where $0.90 \leq a \leq 1.8$, $0 \leq b \leq 0.9$, $0 \leq c \leq 0.5$, $0 \leq d \leq 0.5$, and $0.001 \leq e \leq 0.1$; $Li_aNiG_bO_2$ where $0.90 \leq a \leq 1.8$ and $0.001 \leq b \leq 0.1$; $Li_aCoG_bO_2$ where $0.90 \leq a \leq 1.8$ and $0.001 \leq b \leq 0.1$; $Li_aMnG_bO_2$ where $0.90 \leq a \leq 1.8$ and $0.001 \leq b \leq 0.1$; $LiaMn_2G_bO_4$ where $0.90 \leq a \leq 1.8$ and $0.001 \leq b \leq 0.1$; $QO_2$; $QS_2$; $LiQS_2$; $V_2O_5$; $LiV_2O_5$; $LiI'O_2$; $LiNiVO_4$; $Li_{(3-f)}J_2(PO_4)_3$ where $0 \leq f \leq 2$; $Li_{(3-f)}Fe_2(PO_4)_3$ where $0 \leq f \leq 2$; and $LiFePO_4$.

In the above formulae, A is Ni, Co, Mn, or a combination thereof; B' is Al, Ni, Co, Mn, Cr, Fe, Mg, Sr, V, a rare earth element, or a combination thereof; D is O, F, S, P, or a combination thereof; E is Co, Mn, or a combination thereof; F' is F, S, P, or a combination thereof; G is Al, Cr, Mn, Fe, Mg, lanthanum (La), cerium (Ce), Sr, V, or a combination thereof; Q is Ti, Mo, Mn, or a combination thereof; I' is Cr, V, Fe, scandium (Sc), yttrium (Y), or a combination thereof; and J is V, Cr, Mn, Co, Ni, Cu, or a combination thereof.

Next, an anode is manufactured as follows. For example, the anode is manufactured using substantially the same method as that used to manufacture the cathode, except that an anode active material is used instead of the composite cathode active material. In addition, in an anode active material composition, a conductive agent, a binder, and a solvent that are substantially the same as those used for the cathode may be used.

For example, an anode active material, a conductive agent, a binder, and a solvent are mixed to prepare an anode active material composition, and the anode active material composition is directly coated onto a Cu current collector, thereby manufacturing an anode plate. In an embodiment, the prepared anode active material composition is cast on a separate support and an anode active material film separated from the support is laminated on a Cu current collector, thereby manufacturing an anode plate.

As the anode active material, any suitable anode active material of a lithium battery may be used. For example, the anode active material includes lithium metal, a metal alloyable with lithium, a transition metal oxide, a non-transition metal oxide, a carbonaceous material, or a combination thereof.

The metal alloyable with lithium may be, for example, silicon (Si), tin (Sn), aluminum (Al), germanium (Ge), lead (Pb), bismuth (Bi), antimony (Sb), an Si—Y' alloy where Y' is an alkali metal, an alkaline earth metal, a Group 13 element, a Group 14 element, a Group 15 element, a Group 16 element, a transition metal, a rare earth element, or a combination thereof, except for Si), an Sn—Y' alloy where Y' is an alkali metal, an alkaline earth metal, a Group 13 element, a Group 14 element, a Group 15 element, a Group 16 element, a transition metal, a rare earth element, or a combination thereof, except for Sn, or the like. Examples of the element Y' include magnesium (Mg), calcium (Ca), strontium (Sr), barium (Ba), radium (Ra), scandium (Sc), yttrium (Y), titanium (Ti), zirconium (Zr), hafnium (Hf), rutherfordium (Rf), vanadium (V), niobium (Nb), tantalum (Ta), dubnium (Db), chromium (Cr), molybdenum (Mo), tungsten (W), seaborgium (Sg), technetium (Tc), rhenium (Re), bohrium (Bh), iron (Fe), lead (Pb), ruthenium (Ru), osmium (Os), hassium (Hs), rhodium (Rh), iridium (Ir), palladium (Pd), platinum (Pt), copper (Cu), silver (Ag), gold (Au), zinc (Zn), cadmium (Cd), boron (B), aluminum (Al), gallium (Ga), tin (Sn), indium (In), thallium (Tl)germanium (Ge), phosphorus (P), arsenic (As), antimony (Sb), bismuth (Bi), sulfur (S), selenium (Se), tellurium (Te), polonium (Po), and a combination thereof.

The transition metal oxide may be, for example, lithium titanium oxide, vanadium oxide, lithium vanadium oxide, or the like.

The non-transition metal oxide may be, for example, $SnO_2$, $SiO_x$ where $0 < x < 2$, or the like.

The carbonaceous material may be, for example, crystalline carbon, amorphous carbon, or a mixture thereof. Examples of the crystalline carbon include graphite, such as natural graphite and artificial graphite that may be in a non-shaped, plate, flake, spherical, or fibrous form. Examples of the amorphous carbon include soft carbon (carbon sintered at low temperatures), hard carbon, a mesophase pitch carbonization product, or a sintered coke.

The amounts of the anode active material, the conductive agent, the binder, and the solvent are not particularly limited and can be determined by one of skill in the art without undue experimentation. At least one of the conductive agent, the binder, and the solvent may be omitted according to the use and configuration of a lithium battery.

Next, a separator to be inserted between the cathode and the anode is prepared.

Any suitable separator may be used. The separator is, for example, a separator having low resistance to migration of ions in an electrolyte and an excellent electrolyte-retaining ability. The separator may include, for example, glass fiber, polyester, Teflon™ polyethylene, polypropylene, polytetrafluoroethylene ("PTFE"), or a combination thereof, each of which is a nonwoven fabric or a woven fabric. For example, a windable separator including polyethylene, polypropylene, or the like is used for a lithium ion battery, and a separator having an excellent organic electrolytic solution-impregnating ability is used for a lithium ion polymer battery.

The separator is manufactured using the following example method, but the present disclosure is not limited thereto, and the method may be adjusted if desired.

First, a polymer resin, a filler, and a solvent are mixed together to prepare a separator composition. The separator composition may be directly coated on an electrode, and then dried to fabricate the separator. In an embodiment, the separator composition may be cast on a support and then dried, and then a separator film separated from the support is laminated on an electrode, thereby completing the fabrication of a separator.

A polymer used to manufacture the separator is not particularly limited, and any suitable polymer that can be used in a binder of an electrode plate may be used. Examples of the polymer include a vinylidenefluoride/hexafluoropropylene copolymer, polyvinylidene fluoride ("PVDF"), polyacrylonitrile, polymethylmethacrylate, and a mixture thereof.

Next, an electrolyte is prepared. The electrolyte may be, for example, an organic electrolytic solution. The organic electrolytic solution may be prepared by, for example, dissolving a lithium salt in an organic solvent.

The organic solvent may be any suitable organic solvent. Examples of the organic solvent include propylene carbonate, ethylene carbonate, fluoroethylene carbonate, butylene carbonate, dimethyl carbonate, diethyl carbonate, methyl ethyl carbonate, methyl propyl carbonate, ethyl propyl carbonate, methyl isopropyl carbonate, dipropyl carbonate, dibutyl carbonate, benzonitrile, acetonitrile, tetrahydrofuran, 2-methyltetrahydrofuran, γ-butyrolactone, dioxolane, 4-methyldioxolane, N,N-dimethylformamide, dimethylacetamide, dimethylsulfoxide, dioxane, 1,2-dimethoxyethane, sulfolane, dichloroethane, chlorobenzene, nitrobenzene, diethylene glycol, dimethyl ether, or a combination thereof.

The lithium salt may be any suitable lithium salt. Examples of the lithium salt include $LiPF_6$, $LiBF_4$, $LiSbF_6$, $LiAsF_6$, $LiClO_4$, $LiCF_3SO_3$, $Li(CF_3SO_2)_2N$, $LiC_4F_9SO_3$, $LiAlO_2$, $LiAlCl_4$, $LiN(C_xF_{2x+1}SO_2)(C_yF_{2y+1}SO_2)$, wherein x and y are natural numbers, LiCl, LiI, or a combination thereof. In an embodiment, the electrolyte is a solid electrolyte. The solid electrolyte may be, for example, boron oxide, lithium oxynitride, or the like, but the present disclosure is not limited thereto, and any suitable solid electrolyte may be used. The solid electrolyte may be formed on the anode using a method, for example, sputtering or the like, or a separate solid electrolyte sheet is arranged on the anode.

Figure 9:
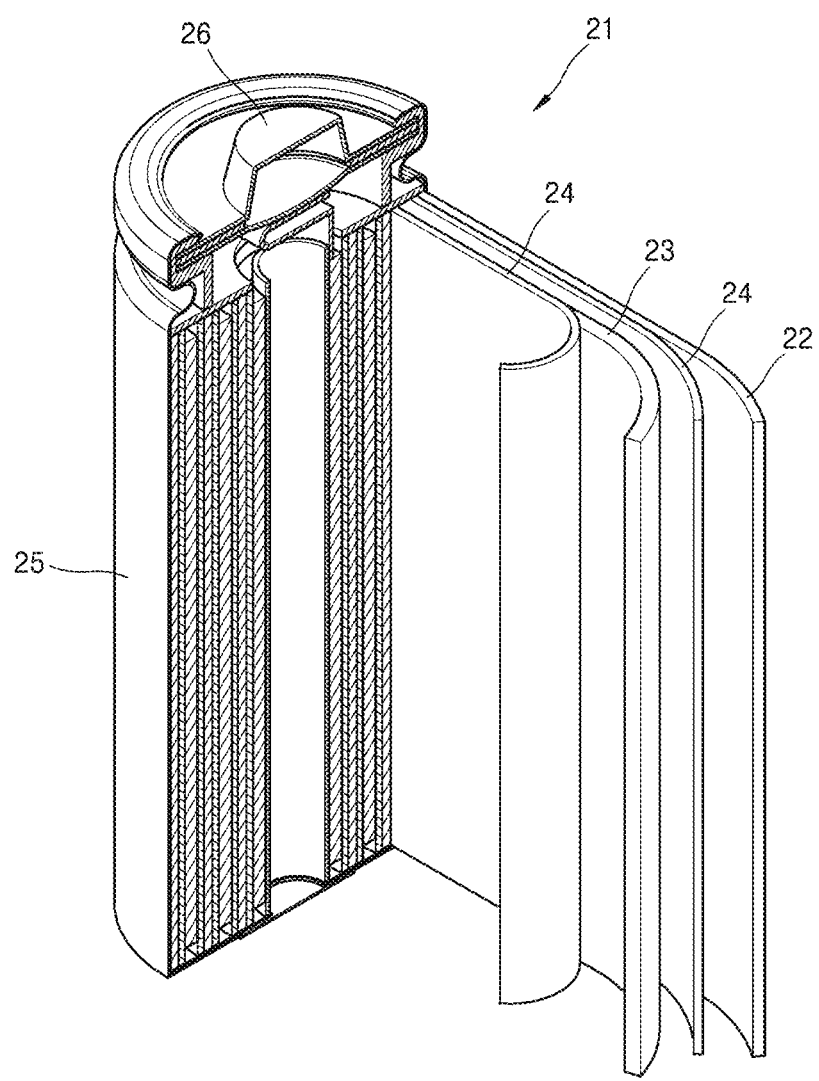
FIG. 9 is a view of an embodiment of a lithium battery.

As illustrated in FIG. 9, a lithium battery 21 includes a cathode 23, an anode 22, and a separator 24. The cathode 23, the anode 22, and the separator 24 may be wound or folded and disposed in a battery case 25. An organic electrolytic solution may be disposed, e.g., injected, into the battery case 25 and the battery case 25 sealed with a cap assembly 26, thereby completing the manufacture of the lithium battery 21. The battery case 25 has a cylindrical shape, but the present disclosure is not limited thereto. For example, the battery case 25 may have a rectangular shape, a thin-film shape, or the like.

A pouch-type lithium battery includes at least one battery assembly. A separator is arranged between a cathode and an anode to form a battery assembly. In an embodiment, battery assemblies are stacked in a bi-cell structure and then impregnated into an organic electrolytic solution, and the resulting structure is put into a pouch and hermetically sealed, thereby completing the manufacture of a pouch-type lithium battery. A plurality of battery assemblies are stacked to form a battery pack, and such a battery pack may be used in all types of devices that require high capacity and high output. For example, the battery pack may be used in a notebook computers, smartphones, or electric vehicles.

A lithium battery has excellent lifespan characteristics and excellent rate capability, and thus is used in, for example, electric vehicles ("EVs"). For example, the lithium battery is used in hybrid vehicles such as plug-in hybrid electric vehicles ("PHEVs"), and the like. In addition, the lithium battery is used in the field to store a large amount of power. For example, the lithium battery is used in electric bikes, electric motor-driven tools, and the like.

The lithium battery including the composite cathode active material according to an embodiment has a capacity of 210 milliampere-hours per gram (mAh/g) or greater and lifespan characteristics of the lithium battery remain good even after 50 cycles or more of charging and discharging.

A method of preparing a composite cathode active material, according to an embodiment is as follows.

First, a nickel-based lithium nickel transition metal oxide having a layered crystal structure and a precursor of a metal oxide are mixed to obtain a composite cathode active material composition.

Subsequently, a first heat-treatment is performed on the composite cathode active material composition in an oxidative atmosphere at a temperature of about 400° C. to about 1,000° C. The oxidative atmosphere is an oxygen- or air-containing atmosphere. The oxidative atmosphere includes oxygen, air, or a combination thereof, and is, for example, air including oxygen.

The first heat treatment is performed at a temperature of, for example, about 400° C. to about 1,000° C., for example, about 500° C. to about 900° C., for example, about 600° C. to about 800° C., for example, about 700° C. to about 750° C. The heat-treatment time ranges from, for example, about 3 hours to about 20 hours, for example about 3 hours to about 15 hours, for example about 3 hours to about 10 hours, for example about 3 hours to about 7 hours, for example about 4 hours to about 6 hours. A heating rate at which the heat treatment temperature is reached is, for example, about 1° C. per minute (° C./min) to about 10° C./min.

The precursor of the metal oxide includes a Co precursor and a precursor of a Group 2 element, a Group 12 element, or a Group 13 element. The Co precursor may be a chloride, sulfate, acetate, nitrate, oxychloride, oxynitrate, or hydroxide that contains Co. Examples of the Co precursor include cobalt nitrate, cobalt sulfate, cobalt chloride, cobalt oxide, and cobalt hydroxide. In addition, the precursor of a Group 2 element, a Group 12 element, or a Group 13 element may be, for example, a chloride, sulfate, nitrate, oxide, or hydroxide that contains a Group 2 element, a Group 12 element, or a Group 13 element, or the like, and examples thereof include magnesium nitrate, magnesium sulfate, magnesium chloride, magnesium oxide, magnesium hydroxide, or a combination thereof.

An amount of the precursor of the metal oxide is about 30 parts by weight or less, for example, about 1 to about 25 parts by weight; about 20 parts by weight or less, for example, about 2 to about 15 parts by weight; or about 10 parts by weight or less, for example, about 3 to about 9 parts by weight, with respect to 100 parts by weight of the nickel-based lithium nickel transition metal oxide having a layered crystal structure. An amount of the solvent is about 300 parts by weight or less, for example, about 1 to about 250 parts by weight; about 200 parts by weight or less, for example, about 5 to about 150 parts by weight; or about 100 parts by weight or less, for example, about 10 to about 75 parts by weight, with respect to 100 parts by weight of the nickel-based lithium nickel transition metal oxide having a layered crystal structure.

The nickel-based lithium nickel transition metal oxide having a layered crystal structure may be prepared by mixing a precursor of a lithium nickel transition metal hydroxide with a precursor of a compound represented by Formula 1 below to obtain a mixture and performing a second heat-treatment on the mixture in an oxidative atmosphere at a temperature of about 400° C. to about 1,000° C.

$$Li_aM1_bO_c \quad \text{Formula 1}$$

wherein, in Formula 1, M1 is Zr, Mn, Si, Mo, Pd, Co, Ni, Ti, Sn, Ir, Pt, Al, Ru, or a combination thereof, and $1.9 \le a \le 4$, $0.9 \le b \le 1.1$, and $2.9 \le c \le 4$.

The second heat-treatment is performed at a temperature of, for example, about 400° C. to about 1,000° C., for example, about 500° C. to about 900° C., for example, about 700° C. to about 800° C., for example, about 700° C. to about 750° C. The heat-treatment time may range from, for example, about 3 hours to about 20 hours, about 3 hours to about 15 hours, about 3 hours to about 10 hours, about 3 hours to about 7 hours, or about 4 hours to about 6 hours. A heating rate at which the heat-treatment temperature is reached ranges from, for example, about 1° C./min to about 10° C./min. As in the first heat-treatment, the oxidative atmosphere is an oxygen- or air-containing atmosphere, and the oxidative atmosphere includes oxygen, air, or a combination thereof, and is, for example, air including oxygen.

The preparation of the nickel-based lithium nickel transition metal oxide having a layered crystal structure may be performed by, for example, a wet process including a solvent. The solvent is not particularly limited and any suitable solvent may be used. The solvent is, for example, distilled water.

In the preparation of the composite cathode active material, the preparing of the lithium nickel transition metal oxide having a layered crystal structure includes: mixing a precursor of a lithium nickel transition metal oxide with a metal precursor to prepare a mixture; and heat-treating the mixture in an oxidative atmosphere at a temperature of 400° C. to 1,000° C. to prepare a lithium nickel transition metal oxide.

The preparation of the mixture is performed by, for example, a dry process that does not use a solvent. The mixture is, for example, a dried powder mixture of lithium nickel transition metal oxide precursor powder and metal precursor powder. In an embodiment, the preparing of the mixture is performed by, for example, a wet process including a solvent. The mixture includes a solvent capable of dissolving the precursor of a lithium nickel transition metal oxide and the metal precursor, and the type of solvent is not particularly limited and any suitable solvent may be used. The solvent may be, for example, water, e.g., distilled water. Through the wet process, a higher concentration of a lithium metal oxide may be included in the grain boundary between primary particles.

The oxidative atmosphere is an oxygen- or air-containing atmosphere. The oxidative atmosphere includes oxygen, air, or a combination thereof, and is, for example, air having an increased amount of oxygen.

The precursor of the lithium nickel transition metal oxide may be an oxide or hydroxide of a metal, or the like, but the present disclosure is not limited thereto, and any suitable second metal-containing material may be used. The precursor of a lithium nickel transition metal oxide may be, for example, LiOH, $Li_2CO_3$, $ZrO_2$, $ZrO(NO_3)_2$, $ZrO(NO_3)_2 \cdot H_2O$, $Zr(NO_3)_2$, $ZrOCl_2$, $ZrOCl_2 \cdot H_2O$, or $Al_2O_3$, or a combination thereof.

The amount of a lithium metal precursor in the mixture is about 30 parts by weight or less, for example, about 1 to about 25 parts by weight; about 20 parts by weight or less, for example, 2 to 15 parts by weight; or about 10 parts by weight or less, about 3 to about 9 parts by weight, with respect to 100 parts by weight of the precursor of a lithium nickel transition metal oxide.

The precursor of the lithium nickel transition metal oxide may comprise, for example, a lithium nickel transition metal hydroxide.

A temperature of the heat treatment process may be a temperature of, for example, about 400° C. to about 1,000° C., about 500° C. to about 900° C., about 600° C. to about 800° C., or about 700° C. to about 750° C. The heat-treatment time may be, for example, about 3 hours to about 20 hours, about 3 hours to about 15 hours, about 3 hours to about 10 hours, about 3 hours to about 7 hours, or about 4 hours to about 6 hours. A heating rate at which the heat treatment temperature is reached, may be from, for example, about 1° C./min to about 10° C./min. Since the heat-treatment temperature, the heat-treatment time, and the heating rate are within the above-described ranges, the lithium metal oxide may be included in the grain boundary between primary particles, and the lithium nickel transition metal oxide may be doped with a metal, such as aluminum, zirconium, or the like.

The present disclosure will now be described in further detail with reference to the following Examples and Comparative Examples. However, these examples are provided for illustrative purposes only and are not intended to limit the scope of the present disclosure.

EXAMPLES

Example 1: Preparation of Composite Cathode Active Material

Zirconium oxide ($ZrO_2$), alumina ($Al_2O_3$), $Ni_{0.88}Co_{0.08}Mn_{0.04}(OH)_2$ (Reshine New Material Co., Ltd., China), and $LiOH \cdot H_2O$, which is a lithium precursor, were mixed to obtain a first mixture. The amount of Zirconium oxide ($ZrO_2$), alumina ($Al_2O_3$), $Ni_{0.88}Co_{0.08}Mn_{0.04}(OH)_2$, and $LiOH \cdot H_2O$, which is a lithium precursor was stoichiometrically adjusted to obtain $Li_{1.09375}(Ni_{0.88}Co_{0.08}Mn_{0.04})Al_{0.00125}Zr_{0.0025}O_2$. The added $Ni_{0.88}Co_{0.08}Mn_{0.04}(OH)_2$ powder included secondary particles which are agglomerates of needle-like primary particles.

The first mixture was put in a furnace and subjected to a first heat treatment at 760° C. for 12 hours while flowing oxygen thereinto.

Through the first heat treatment process, $Li_{1.09375}(Ni_{0.88}Co_{0.08}Mn_{0.04})Al_{0.00125}Zr_{0.0025}O_2$, which is a lithium nickel transition metal oxide having a layered crystal structure, was obtained. A $Li_2ZrO_3$ having a monoclinic crystal structure was formed on a grain boundary between a plurality of primary particles.

A precursor of $Co(NO_3)_2 \cdot 6H_2O$ and $Mg(NO_3)_2 \cdot 6H_2O$, which were mixed in a weight ratio of 1.5:1 such that a total amount of Co and Mg in the coating film formed on a surface of the secondary particle of the composite cathode active material was 0.25 parts by weight, with respect to 100 parts by weight of the lithium nickel transition metal oxide ($Li_{1.09375}(Ni_{0.88}Co_{0.08}Mn_{0.04})Al_{0.00125}Zr_{0.0025}O_2$), was prepared, and then added to 10 parts by weight of distilled water, followed by stirring at room temperature (25° C.) for 1 minute, thereby preparing a first composition.

100 parts by weight of $Li_{1.09375}(Ni_{0.88}Co_{0.08}Mn_{0.04})Al_{0.00125}Zr_{0.0025}O_2$ powder was added to 90 parts by weight of distilled water to prepare a second composition, and while the second composition was stirred at room temperature for 20 minutes, the first composition obtained according to the above-described process was added thereto, thereby preparing a second mixture.

The second mixture was dried in an oven at 150° C. for 15 hours.

The dried resultant was put in a furnace and subjected to heat treatment at 720° C. for 5 hours while flowing oxygen thereinto, thereby completing the preparation of the composite cathode active material.

A coating film including $LiCoO_2$, $Co_3O_4$, and MgO was formed on a surface of the secondary particle formed of $Li_{1.09375}(Ni_{0.88}Co_{0.08}Mn_{0.04})Al_{0.00125}Zr_{0.0025}O_2$. A total amount of Co and Mg in the coating film was 0.25 parts by weight, with respect to 100 parts by weight of the lithium nickel transition metal oxide ($Li_{1.09375}(Ni_{0.88}Co_{0.08}Mn_{0.04})Al_{0.00125}Zr_{0.0025}O_2$).

Figure 2A:
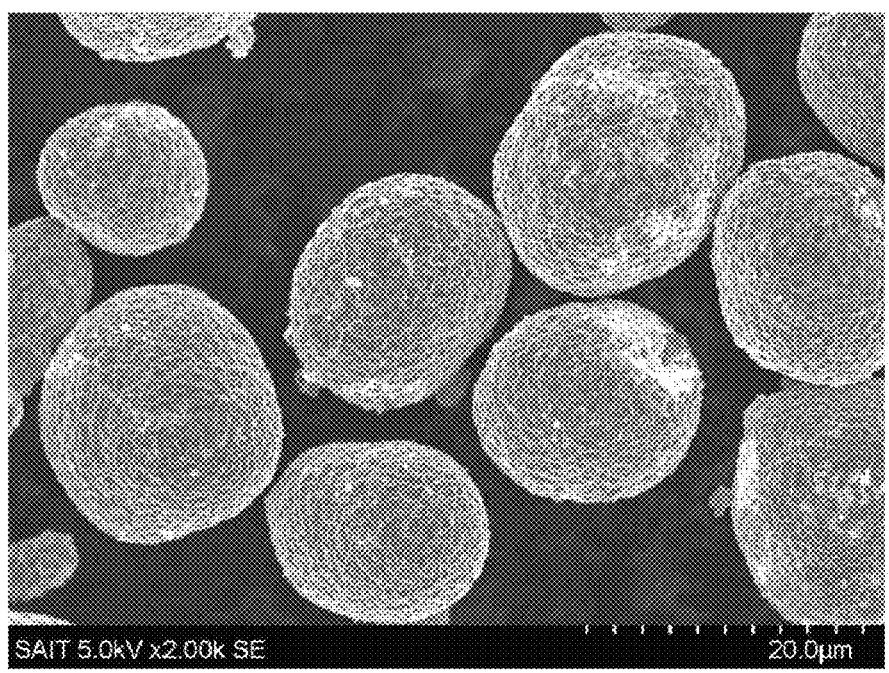
FIGS. 2A and 2B are scanning electron microscope images of a composite cathode active material of Example 1.
Figure 2B:
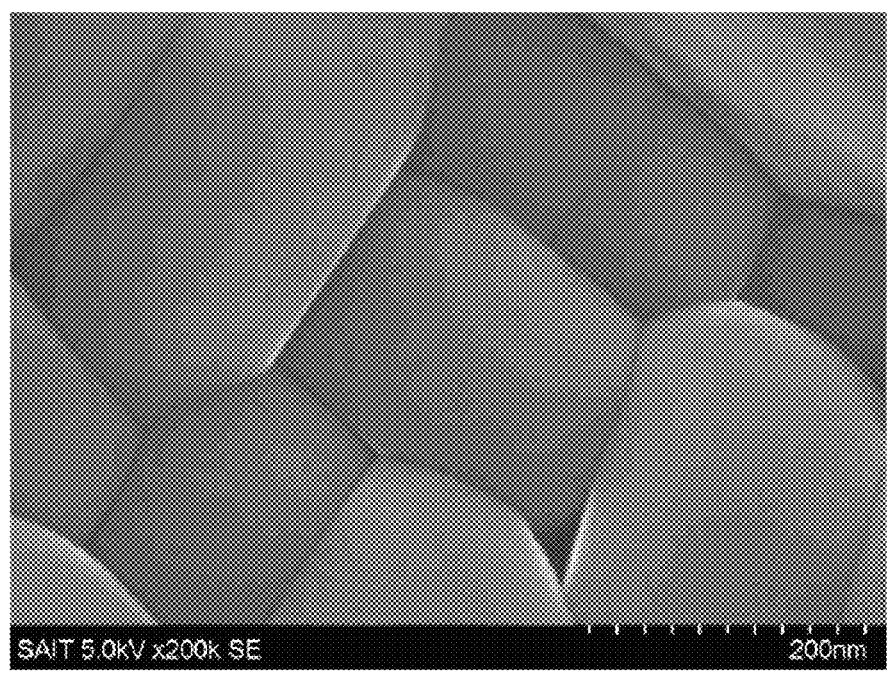

FIGS. 2A and 2B are scanning electron microscope images of the composite cathode active material of Example 1.

Example 2: Preparation of Composite Cathode Active Material

A composite cathode active material was prepared in the same manner as in Example 1, except that the amount of the precursor of $Co(NO_3)_2 \cdot 6H_2O$ and $Mg(NO_3)_2 \cdot 6H_2O$ mixed in a weight ratio of 1.5:1 was changed such that the total amount of Co and Mg in the coating film formed on the secondary particle of the composite cathode active material was 0.75 parts by weight, with respect to 100 parts by weight of the lithium nickel transition metal oxide having a layered crystal structure.

The total amount of Co and Mg in the coating film was 0.75 parts by weight, with respect to 100 parts by weight of the lithium nickel transition metal oxide having a layered crystal structure.

Examples 2-1 to 2-7

Composite cathode active materials were prepared in the same manner as in Example 2, except that heat treatment on the second mixture was performed under conditions shown in Table 1 below.

TABLE 1

| Classification | Heat treatment conditions on the second mixture |
|---|---|
| Example 2-1 | 600° C., 5 hours |
| Example 2-2 | 700° C., 5 hours |
| Example 2-3 | 740° C., 5 hours |
| Example 2-4 | 800° C., 5 hours |
| Example 2-5 | 720° C., 0.5 hours |
| Example 2-6 | 720° C., 10 hours |
| Example 2-7 | 720° C., 20 hours |

Example 3: Preparation of Composite Cathode Active Material

A composite cathode active material was prepared in the same manner as in Example 1, except that the amount of the precursor of $Co(NO_3)_2 \cdot 6H_2O$ and $Mg(NO_3)_2 \cdot 6H_2O$ mixed in a weight ratio of 1.5:1 was changed such that the total amount of Co and Mg in the coating film formed on the secondary particle of the composite cathode active material was 1.5 parts by weight, with respect to 100 parts by weight of the lithium nickel transition metal oxide having a layered crystal structure.

The total amount of Co and Mg in the coating film was 1.5 parts by weight, with respect to 100 parts by weight of the lithium nickel transition metal oxide having a layered crystal structure.

Example 4: Preparation of Composite Cathode Active Material

A composite cathode active material was prepared in the same manner as in Example 1, except that the amount of the precursor of $Co(NO_3)_2 \cdot 6H_2O$ and $Mg(NO_3)_2 \cdot 6H_2O$ mixed in a weight ratio of 1.5:1 was changed such that the total amount of Co and Mg in the coating film formed on the secondary particle of the composite cathode active material was 5 parts by weight, with respect to 100 parts by weight of the lithium nickel transition metal oxide having a layered crystal structure.

The total amount of Co and Mg in the coating film was 5 parts by weight, with respect to 100 parts by weight of the lithium nickel transition metal oxide having a layered crystal structure.

Example 5: Preparation of Composite Cathode Active Material

A composite cathode active material was prepared in the same manner as in Example 1, except that in preparing a lithium nickel transition metal compound having a layered crystal structure, the mixing ratio of zirconium oxide ($ZrO_2$) and alumina ($Al_2O_3$), which are second metal precursors, $Ni_{0.88}Co_{0.08}Mn_{0.04}(OH)_2$ (Reshine New Material Co., Ltd., China), and $LiOH \cdot H_2O$, which is a lithium precursor, was changed, thereby obtaining $Li_{1.09625}(Ni_{0.88}Co_{0.08}Mn_{0.04})Al_{0.00125}Zr_{0.005}O_2$.

Example 6: Preparation of Composite Cathode Active Material

A composite cathode active material was prepared in the same manner as in Example 5, except that the total amount of $Co(NO_3)_2 \cdot 6H_2O$ and $Mg(NO_3)_2 \cdot 6H_2O$ was changed such that the total amount of Co and Mg in the coating film formed on the secondary particle of the composite cathode active material was 0.75 parts by weight, with respect to 100 parts by weight of the lithium nickel transition metal oxide having a layered crystal structure.

The total amount of Co and Mg in the coating film was 0.75 parts by weight, with respect to 100 parts by weight of the lithium nickel transition metal oxide having a layered crystal structure.

Comparative Example 1: Preparation of Composite Cathode Active Material $Ni_{0.88}Co_{0.08}Mn_{0.04}(OH)_2$ (Reshine New Material Co., Ltd., China) and $LiOH \cdot H_2O$, which is a lithium precursor, were mixed in a molar ratio of 1:1.09 to obtain a mixture. The mixture was put in a furnace and subjected to first heat treatment at 760° C. for 12 hours while flowing oxygen thereinto.

Through the first heat treatment process, $Li_{1.09}Ni_{0.88}Co_{0.08}Mn_{0.04}O_2$, which is a lithium nickel transition metal oxide having a layered crystal structure, was obtained.

Comparative Example 2: Preparation of Composite Cathode Active Material

A composite cathode active material was prepared in the same manner as in Example 1, except that zirconium oxide was not added in the preparation of the first mixture.

Comparative Example 3: Preparation of Composite Cathode Active Material 100 parts by weight of the $Li_{1.09375}(Ni_{0.88}Co_{0.08}Mn_{0.04})Al_{0.00125}Zr_{0.0025}O_2$ powder prepared by the first heat treatment process of Example 1 was put in 90 parts by weight of distilled water and stirred, and then the precipitate was filtered and separated, and a water washing process for removing residual lithium was performed once.

The separated precipitate was dried in an oven at 150° C. for 15 hours to prepare a dried product.

The dried product was put in a furnace and subjected to heat treatment at 720° C. for 5 hours while flowing oxygen thereinto, thereby completing the preparation of a composite cathode active material.

Comparative Example 4: Preparation of Composite Cathode Active Material

A composite cathode active material was prepared in the same manner as in Example 1, except that the first composition was prepared according to the following process.

Only a $Co(NO_3)_2 \cdot 6H_2O$ precursor was prepared such that the amount of Co in the coating film formed on a surface of the secondary particle of the composite cathode active material was 0.75 parts by weight, with respect to 100 parts by weight of the lithium nickel transition metal oxide, and then added to 10 parts by weight of distilled water, followed by stirring at room temperature (25° C.) for 1 minute, thereby preparing a first composition.

Comparative Example 5: Preparation of Composite Cathode Active Material

A composite cathode active material was prepared in the same manner as in Example 1, except that the first composition was prepared according to the following process.

Only a $Co(NO_3)_2 \cdot 6H_2O$ precursor was prepared such that the amount of Co in the coating film formed on a surface of the secondary particle of the composite cathode active material was 5 parts by weight, with respect to 100 parts by weight of the lithium nickel transition metal oxide, and then added to 10 parts by weight of distilled water, followed by stirring at room temperature (25° C.) for 1 minute, thereby preparing a first composition.

Comparative Example 6: Preparation of Composite Cathode Active Material

A composite cathode active material was prepared in the same manner as in Example 1, except that the first composition was prepared according to the following process.

Only a $Mg(NO_3)_2 \cdot 6H_2O$ precursor was prepared such that the amount of Mg in the coating film formed on a surface of the secondary particle of the composite cathode active material was 0.75 parts by weight, with respect to 100 parts by weight of the lithium nickel transition metal oxide, and then added to 10 parts by weight of distilled water, followed by stirring at room temperature (25° C.) for 1 minute, thereby preparing a first composition.

Comparative Example 7: Preparation of Composite Cathode Active Material

A composite cathode active material was prepared in the same manner as in Example 1, except that the first composition was prepared according to the following process.

Only a $Mg(NO_3)_2 \cdot 6H_2O$ precursor was prepared such that the amount of Mg in the coating film formed on a surface of the composite cathode active material was 5 parts by weight, with respect to 100 parts by weight of the lithium nickel transition metal oxide, and then added to 10 parts by weight of distilled water, followed by stirring at room temperature (25° C.) for 1 minute, thereby preparing a first composition.

Manufacture Example 1: Lithium Battery (Coin Half-Cell)

A mixture prepared by mixing the composite cathode active material of Example 1, a carbon conductive agent (Denka Black), and polyvinylidenefluoride ("PVdF") in a weight ratio of 92:4:4 was mixed with N-methylpyrrolidone ("NMP") in an agate mortar to prepare a slurry. The slurry was bar coated onto an aluminum current collector having a thickness of 15 micrometers (μm), dried at room temperature, and then dried once again in a vacuum at 120° C., and the resulting current collector was roll-pressed and punched, thereby manufacturing a cathode having a thickness of 45 μm.

The manufactured cathode plate, Li metal as a counter electrode, a PTFE separator, and a solution as an electrolyte prepared by dissolving 1.15 molar (M) $LiPF_6$ in ethylene carbonate ("EC"), ethyl methyl carbonate ("EMC"), and dimethyl carbonate ("DMC") in a volume ratio of 3:4:3 were used to manufacture a coin half-cell.

Manufacture Examples 2 to 6: Lithium Batteries (Coin Half-Cells)

Coin half-cells were manufactured in the same manner as in Manufacture Example 1, except that the composite cathode active materials of Examples 2 to 6 were respectively used instead of the composite cathode active material of Example 1.

Manufacture Examples 2-1 to 2-7: Lithium Batteries (Coin Half-Cells)

Coin half-cells were manufactured in the same manner as in Manufacture Example 1, except that the composite cathode active materials of Examples 2-1 to 2-7 were respectively used instead of the composite cathode active material of Example 1.

Manufacture Example 7: Addition of Lithium Iron Phosphate

A coin half-cell was manufactured in the same manner as in Manufacture Example 1, except that 5 parts by weight of $LiFePO_4$ having an olivine structure was added to 100 parts by weight of the composite cathode active material of Example 1.

Comparative Manufacture Examples 1 to 7

Coin half-cells were manufactured in the same manner as in Manufacture Example 1, except that the composite cathode active materials prepared according to Comparative Examples 1 to 7 were respectively used instead of the composite cathode active material of Example 1.

Manufacture Example 8: Manufacture of Lithium Battery (Full Cell)

A mixture prepared by mixing the composite cathode active material of Example 1, a carbon conductive agent (Denka Black), and PVdF in a weight ratio of 92:4:4 was mixed with NMP in an agate mortar to prepare a cathode active material slurry. The slurry was bar coated onto an aluminum current collector having a thickness of 15 μm, dried at room temperature, and then dried once again in a vacuum at 120° C., and the resulting current collector was roll-pressed and punched, thereby manufacturing a cathode having a thickness of 45 μm.

Graphite particles having a mean particle diameter of 25 μm, a styrene-butadiene rubber ("SBR") binder (ZEON), and carboxymethylcellulose ("CMC") (NIPPON A&L) were mixed in a weight ratio of 97:1.5:1.5, and then the resulting mixture was added to distilled water and stirred using a mechanical stirrer for 60 minutes to prepare an anode active material slurry. The slurry was applied on a copper (Cu) current collector having a thickness of 10 μm using a doctor blade, and the resulting current collector was dried in a hot air dryer at 100° C. for 0.5 hours, dried once again in vacuum at 120° C. for 4 hours, and roll-pressed and punched, thereby manufacturing an anode having a thickness of 65 μm.

The cathode, the anode, a PTFE separator, and a solution as an electrolyte prepared by dissolving 1.15 M $LiPF_6$ in EC, EMC, and DMC in a volume ratio of 3:4:3 were used to manufacture a full cell.

Manufacture Examples 9 and 10: Manufacture of Lithium Batteries (Full Cells)

Full cells were manufactured in the same manner as in Manufacture Example 8, except that the composite cathode active materials of Examples 2 and 3 were respectively used instead of the composite cathode active material of Example 1.

Manufacture Example 11: Manufacture of Lithium Battery (Full Cell)

A full cell was manufactured in the same manner as in Manufacture Example 8, except that 5 parts by weight of $LiFePO_4$ was added to 100 parts by weight of the composite cathode active material of Example 1.

Comparative Manufacture Examples 8 to 14

Full cells were manufactured in the same manner as in Manufacture Example 8, except that the composite cathode active materials prepared according to Comparative Examples 1 to 7 were respectively used instead of the composite cathode active material of Example 1.

Evaluation Example 1: X-Ray Diffraction ("XRD") Spectrum Evaluation

Figure 3:
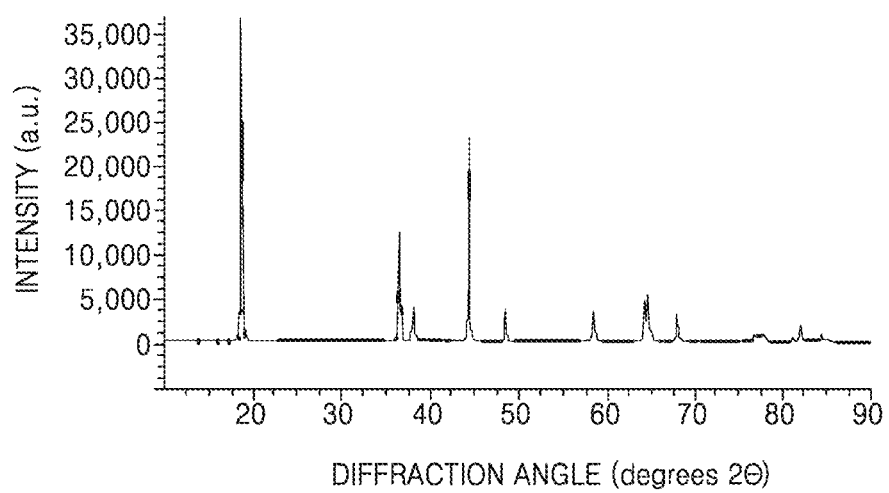
FIG. 3 is a graph of intensity (arbitrary units (a.u.)) versus diffraction angle (degrees two-theta, 2θ) showing the results of X-ray diffraction ("XRD") analysis of the composite cathode active material of Example 1.

An XRD spectrum of the composite cathode active material of Example 1 was measured and results thereof are shown in FIG. 3. Cu Kα radiation was used in XRD spectrum measurement.

As illustrated in FIG. 3, in the XRD spectrum of the composite cathode active material of Example 1, only a peak for a phase having a layered crystal structure belonging to an R-3m space group appeared.

It was confirmed through Rietveld analysis that the coating included a $Co_3O_4$ phase and an MgO phase.

Evaluation Example 2: Evaluation of Compositions Inside and on the Surface of the Core FIGS. 4A to 4E are high-angle annular dark field scanning transmission electron microscopy ("HAADF STEM") and energy-dispersive X-ray spectroscopy ("EDS") images showing cross-sections of the composite cathode active material of Example 1.

As illustrated in FIGS. 4A to 4E, it was confirmed that the coating including Co and Mo was formed on a core.

Figure 4A:
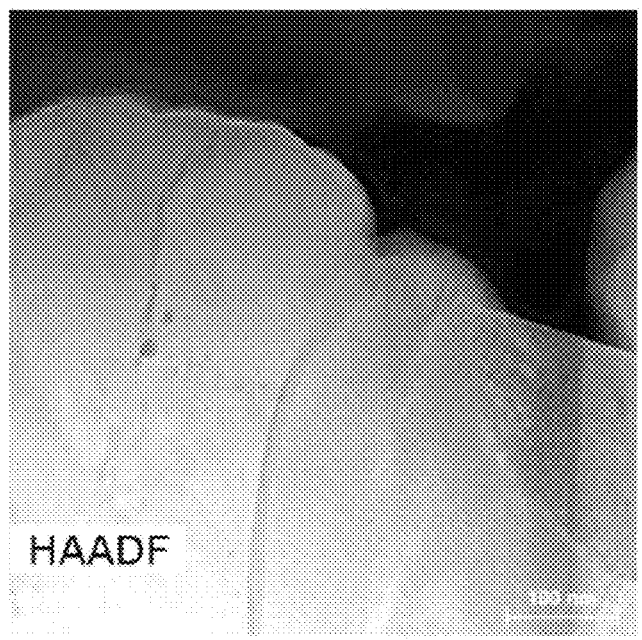
FIGS. 4A to 4E are high-angle annular dark field scanning transmission electron microscopy ("HAADF STEM") and energy-dispersive X-ray spectroscopy ("EDS") images showing cross-sections of the composite cathode active material of Example 1.
Figure 4B:
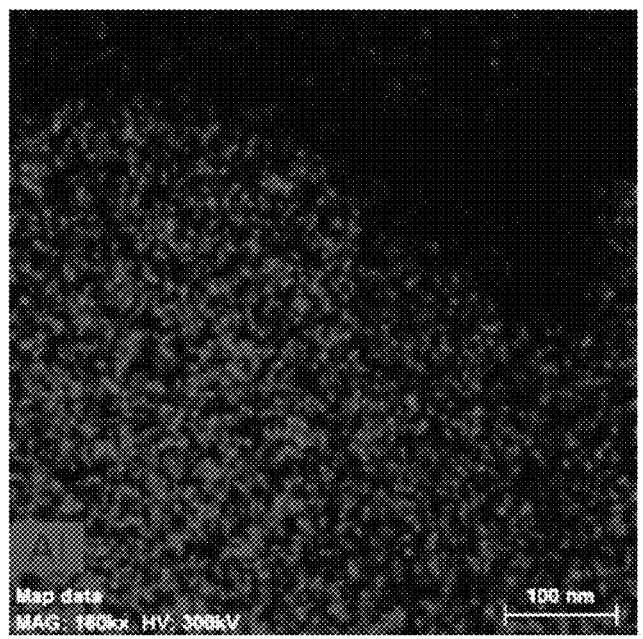
Figure 4C:
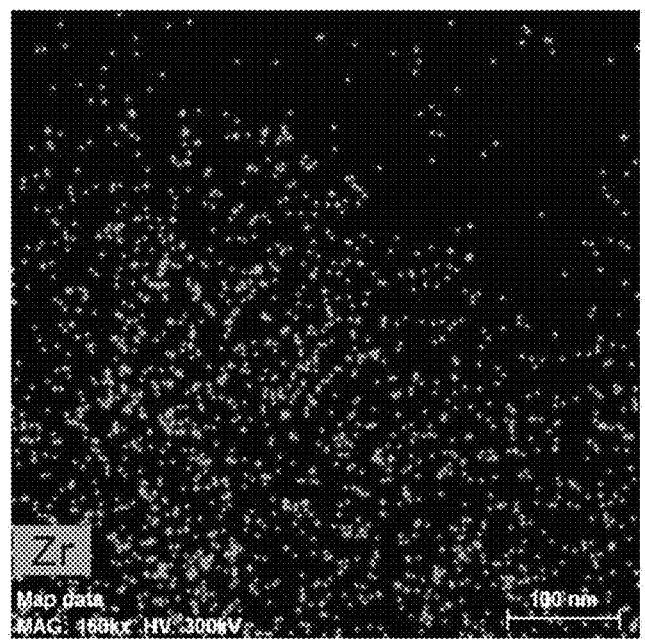
Figure 4D:
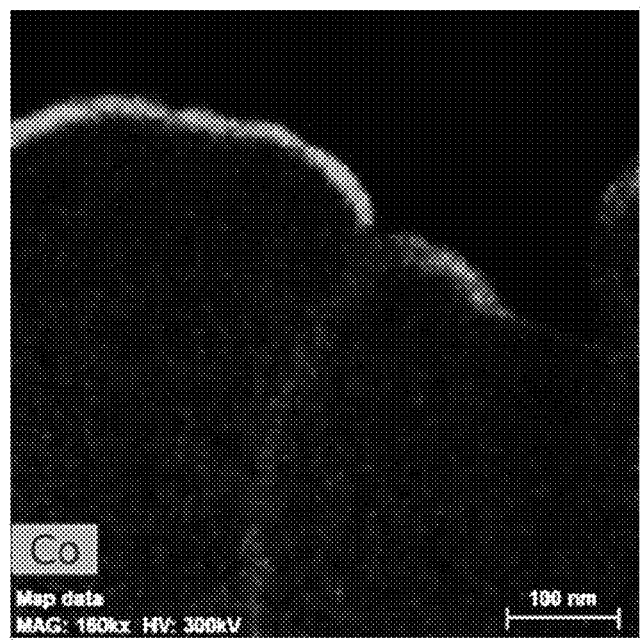
Figure 4E:
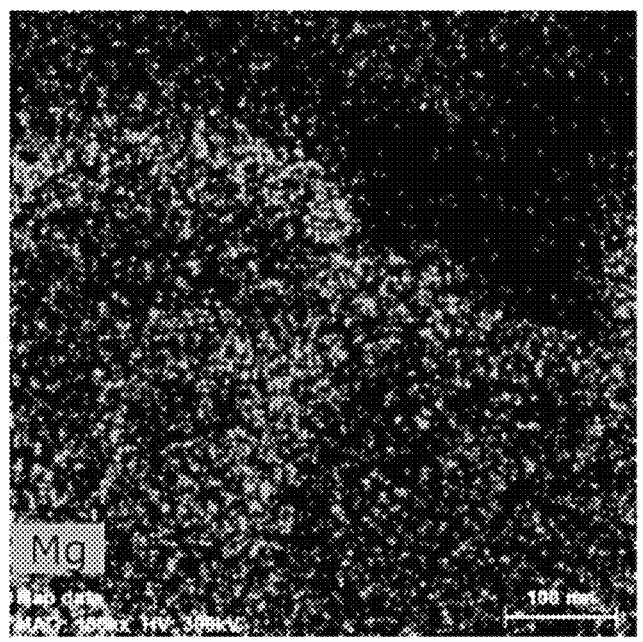

In addition, it was confirmed from FIGS. 4B and 4C that the concentration of Co and/or Mg included in the coating was greater than the concentration of Co and/or Mg included in primary particles. Referring to FIGS. 4B and 4C, the higher the concentration of a metal, the brighter the color corresponding to the metal. That is, it was confirmed that a coating layer including high concentrations of Co and Mg was formed on the primary particles included in the core.

As illustrated in FIGS. 4A and 4B, the coating had a thickness of about 10 nanometers (nm) to about 20 nm.

Although not shown in the drawings, it was confirmed through additional high resolution analysis that a Zr-containing separate phase was present at a grain boundary between primary particles included in the core and on a surface of the core. The separate phase was a $Li_2ZrO_3$ phase having a monoclinic crystal structure belonging to a C2/m space group.

Evaluation Example 3: Evaluation of Amount of Residual Lithium

The amount of residual lithium on a surface of each of the composite cathode active materials of Examples 1 and 2 and Comparative Examples 1 and 2 was measured and some of the results thereof are shown in Table 2 below.

The amount of residual lithium was evaluated by measuring the Li content in $Li_2CO_3$ and LiOH remaining on the surface of each composite cathode active material by a wet process (or titration).

For the details of the measurement method, reference may be made to, for example, the method disclosed in paragraph number [0054] of JP 2016-081903A.

TABLE 2

| | Amount of residual lithium (parts per million (ppm) by weight |
|---|---|
| Comparative Example 1 | 1786 |
| Comparative Example 2 | 1862 |
| Example 1 | 518 |
| Example 2 | 656 |

As shown in Table 2, it was confirmed that the amount of residual lithium on the surface of each of the composite cathode active materials of Examples 1 and 2 was reduced compared to that on the surface of each of the composite cathode active materials of Comparative Examples 1 and 2. While not wanting to be bound by theory, it is understood that the reduced content of residual lithium is because residual lithium on the surface of the lithium nickel transition metal oxide sequentially reacted with the precursor of the metal oxide, thereby forming a coating film on the surface of the secondary particle.

Also, lithium batteries including the composite cathode active materials of Examples 1 and 2 exhibited enhanced lifespan characteristics. While not wanting to be bound by theory, it is understood that the improved performance is due to suppressed gas generation during charge and discharge and a suppressed side reaction with an electrolytic solution, as compared to lithium batteries including the composite cathode active materials of Comparative Examples 1 and 2.

Evaluation Example 4: Evaluation of Charge and Discharge Characteristics at Room Temperature The lithium batteries of Manufacture Examples 5 and 6 and Comparative Manufacture Examples 1 and 2 were each charged at a constant current of 0.1 C rate at 25° C. until the voltage reached 4.35 volts (V) (vs. Li/Li$^+$), and then were each discharged with a constant current of 0.1 C rate until the voltage reached 2.8 V (vs. Li/Li$^+$) (1$^{st}$ cycle, formation cycle).

Each lithium battery after the 1$^{st}$ cycle was charged at a constant current of 0.33 C rate at 25° C. until the voltage reached 4.35 V (vs. Li/Li$^+$), and then, while maintaining a constant voltage of 4.35 V, cut off at a current of 0.05 C rate. Subsequently, each lithium battery was discharged at a constant current of 0.2 C rate until the voltage reached 2.8 V (vs. Li/Li$^+$) (2$^{nd}$ cycle).

Each lithium battery after the 2$^{nd}$ cycle was charged at a constant current of 1 C rate at 25° C. until the voltage reached 4.35 V (vs. Li/Li$^+$), and then was discharged at a constant current of 1 C rate until the voltage reached 2.8 V (vs. Li/Li$^+$), and this cycle of charging and discharging was repeated 50 times up to the 52$^{th}$ cycle under the same conditions.

In all the cycles of charging and discharging, there was a rest period of 20 minutes at the end of each cycle of charging/discharging.

Some of the charge and discharging experimental results are shown in Table 3 below. A capacity retention at the 52$^{th}$ cycle is defined using Equation 1 below:

Capacity retention=(discharge capacity at 52$^{th}$ cycle/ discharge capacity at 3$^{rd}$ cycle)×100%   Equation 1

TABLE 3

| Classification | Discharge capacity at 2$^{nd}$ cycle (mAh/g) | Capacity retention (%) |
|---|---|---|
| Comparative Manufacture Example 1 | 220 | 83.2 |
| Comparative Manufacture Example 2 | 220 | 84.6 |
| Manufacture Example 5 | 222 | 90.6 |
| Manufacture Example 6 | 223 | 88.0 |

As shown in Table 3, the lithium batteries of Manufacture Examples 5 and 6 exhibited enhanced lifespan characteristics without a substantial decrease in capacity, as compared to the lithium batteries of Comparative Manufacture Examples 1 and 2.

While not wanting to be bound by theory, it is understood that the enhanced lifespan characteristics are due to the fact that a surface of the composite cathode active material included in each of the lithium batteries of Manufacture Examples 5 and 6 was stabilized by the coating film, and thus a side reaction with an electrolytic solution was suppressed. In addition, this is because, in the composite cathode active materials included in the lithium batteries of Manufacture Examples 5 and 6, Li$_2$ZrO$_3$ is located at a grain boundary between primary particles, thereby coating the primary particles, and thus a side reaction between the primary particles included in the core and the electrolytic solution, and the elution of a transition metal from the primary particles were suppressed.

Evaluation Example 5: Evaluation of Charge and Discharge Characteristics at Room Temperature The lithium batteries of Manufacture Examples 1, 2, 2-1 to 2-7, 3, and 4 and Comparative Manufacture Examples 3 to 5 were each charged at a constant current of 0.1 C rate at 25° C. until the voltage reached 4.35 V (vs. Li/Li$^+$), and then were each discharged with a constant current of 0.1 C rate until the voltage reached 2.8 V (vs. Li/Li$^+$) (1$^{st}$ cycle, formation cycle).

Each lithium battery after the 1$^{st}$ cycle was charged at a constant current of 0.33 C rate at 25° C. until the voltage reached 4.35 V (vs. Li/Li$^+$), and then, while maintaining a constant voltage of 4.35 V, cut off at a current of 0.05 C rate. Subsequently, each lithium battery was discharged at a constant current of 0.2 C rate until the voltage reached 2.8 V (vs. Li/Li$^+$) (2$^{nd}$ cycle).

Each lithium battery after the 2$^{nd}$ cycle was charged at a constant current of 1 C rate at 25° C. until the voltage reached 4.35 V (vs. Li/Li$^+$), and then was discharged at a constant current of 1 C rate until the voltage reached 2.8 V (vs. Li/Li$^+$) (3$^{rd}$ cycle), and this cycle of charging and discharging was repeated 50 times up to the 52$^{th}$ cycle under the same conditions. In all the cycles of charging and discharging, there was a rest period of 20 minutes at the end of each cycle of charging/discharging.

Some of the charging and discharging experimental results are shown in Table 4 below. A capacity retention at the 52$^{th}$ cycle is defined using Equation 1 below:

Capacity retention=(discharge capacity at 52$^{th}$ cycle/ discharge capacity at 3$^{rd}$ cycle)×100%   Equation 1

The evaluation results are shown in Tables 4 and 5 below.

TABLE 4

| Classification | Capacity retention (%) |
|---|---|
| Comparative Manufacture Example 3 (water washing) | 94 |
| Comparative Manufacture Example 4 (Co 0.75 wt %) | 93 |
| Comparative Manufacture Example 5 (Co 5 wt %) | 91 |
| Manufacture Example 1 (Co 0.15 wt %/Mg 0.1 wt %) | 95 |
| Manufacture Example 2 (Co 0.45 wt %/Mg 0.3 wt %) | 94 |
| Manufacture Example 3 (Co 0.9 wt %/Mg 0.6 wt %) | 94 |
| Manufacture Example 4 (Co 3 wt %/Mg 2 wt %) | 93 |

TABLE 5

| Classification | Capacity retention (%) |
|---|---|
| Manufacture Example 2 (720° C., 5 h) (Co 0.45 wt %/Mg 0.3 wt %) | 94 |
| Manufacture Example 2-1 (600° C., 5 h) (Co 0.45 wt %/Mg 0.3 wt %) | 93 |
| Manufacture Example 2-2 (700° C., 5 h) (Co 0.45 wt %/Mg 0.3 wt %) | 95 |
| Manufacture Example 2-3 (740° C., 5 h) (Co 0.45 wt %/Mg 0.3 wt %) | 94 |
| Manufacture Example 2-4 (800° C., 5 h) (Co 0.45 wt %/Mg 0.3 wt %) | 94 |

TABLE 5-continued

| Classification | Capacity retention (%) |
| --- | --- |
| Manufacture Example 2-5 (720° C., 0.5 h) (Co 0.45 wt %/Mg 0.3 wt %) | 93 |
| Manufacture Example 2-6 (720° C., 10 h) (Co 0.45 wt %/Mg 0.3 wt %) | 95 |
| Manufacture Example 2-7 (720° C., 20 h) (Co 0.45 wt %/Mg 0.3 wt %) | 95 |

As shown in Table 4, the lithium batteries of Manufacture Examples 1 to 4 exhibited enhanced lifespan characteristics, as compared to the lithium batteries of Comparative Manufacture Examples 4 and 5. The enhanced lifespan characteristics results from the fact that a surface of the composite cathode active material included in each of the lithium batteries of Manufacture Examples 1 to 4 was stabilized by the coating film, and thus a side reaction with an electrolytic solution was suppressed. In addition, the excellent lifespan characteristics exhibited by the lithium batteries of Manufacture Examples 1, 2, 2-1 to 2-7, 3, and 4 as shown in Tables 4 and 5 results from the fact that, in the composite cathode active materials, $Li_2ZrO_3$ is located at a grain boundary between primary particles, thereby coating the primary particles, and thus a side reaction between the primary particles included in the core and the electrolytic solution, and the elution of a transition metal from the primary particles were suppressed. In addition, as can be seen in Table 5, capacity and lifespan characteristics of each lithium battery varied depending on heat treatment conditions and the most excellent lifespan characteristics were exhibited at 720° C. for 5 hours.

In addition, all the lithium batteries of Manufacture Examples 1, 2, 2-1 to 2-7, 3, and 4 exhibited a discharge capacity of about 210 mAh/g or greater at the $2^{nd}$ cycle, from which it was confirmed that the lithium batteries had excellent capacity characteristics.

Evaluation Example 6: Evaluation of Charge and Discharge Characteristics at High Temperature Each of the lithium batteries of Manufacture Examples 9 and 11 were each charged at a constant current of 0.1 C rate at 45° C. until the voltage reached 4.30 V (vs. Li/Li$^+$), and then was discharged with a constant current of 0.1 C rate until the voltage reached 2.8 V (vs. Li/Li$^+$) ($1^{st}$ cycle, formation cycle).

Each lithium battery after the $1^{st}$ cycle was charged at a constant current of 0.33 C rate at 45° C. until the voltage reached 4.30 V (vs. Li/Li$^+$) and then, while maintaining a constant voltage of 4.30 V, the charging process was cut off at a current of 0.05 C rate. Subsequently, each lithium battery was discharged at a constant current of 0.2 C rate until the voltage reached 2.8 V (vs. Li/Li$^+$) ($2^{nd}$ cycle).

Each lithium battery after the $2^{nd}$ cycle was charged at a constant current of 1 C rate at 45° C. until the voltage reached 4.30 V (vs. Li/Li$^+$), and then was discharged at a constant current of 1 C rate until the voltage reached 2.8 V (vs. Li/Li$^+$) ($3^{rd}$ cycle), and this cycle of charging and discharging was repeated 200 times up to the $202^{th}$ cycle under the same conditions.

In all the cycles of charging and discharging, there was a rest period of 20 minutes at the end of each cycle of charging/discharging.

Figure 5:
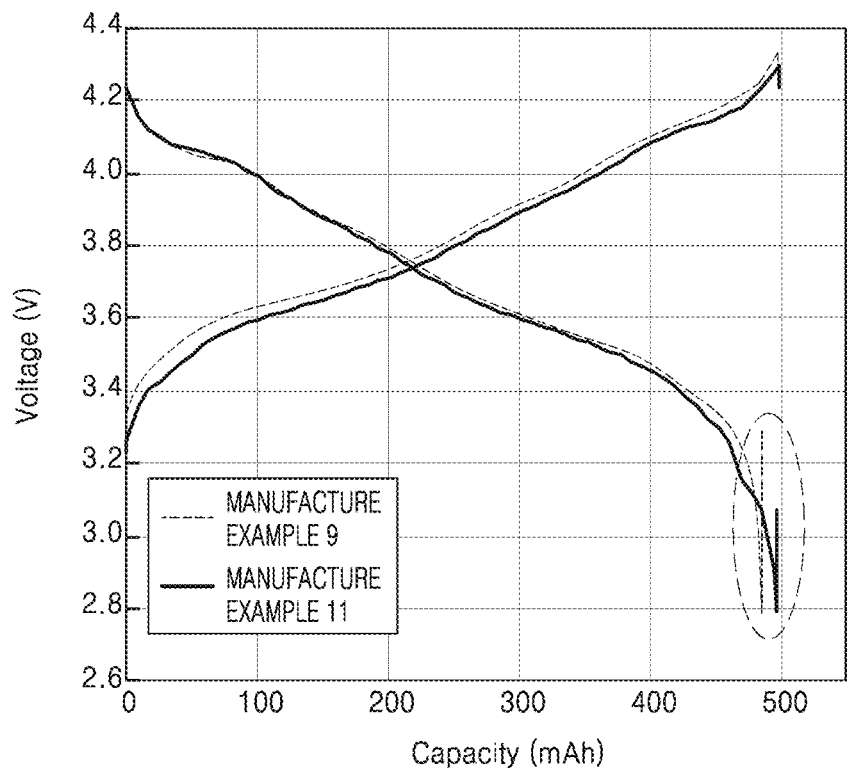
FIG. 5 is a graph of voltage (volts (V)) versus capacity (milliampere-hours (mAh)) showing changes in capacity according to voltage of lithium batteries of Manufacturing Examples 9 and 11.
Figure 6:
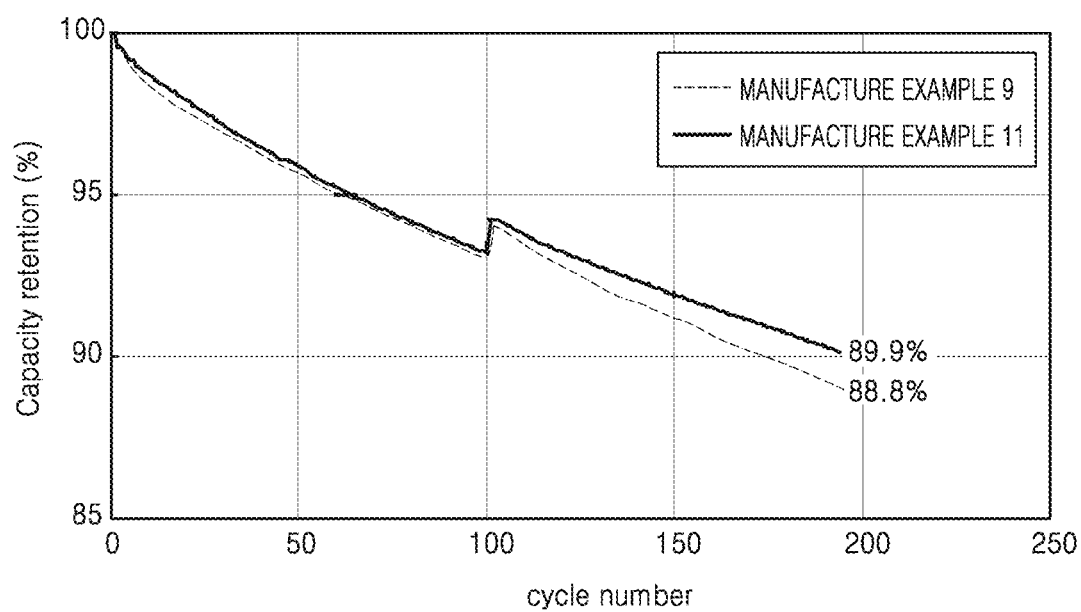
FIG. 6 is a graph of capacity retention (percent (%)) versus cycle number showing a change in capacity retention of each of the lithium batteries of Manufacturing Examples 9 and 11.

Some of the charging and discharging experimental results are illustrated in Table 6 and FIGS. 5 and 6.

Figure 7:
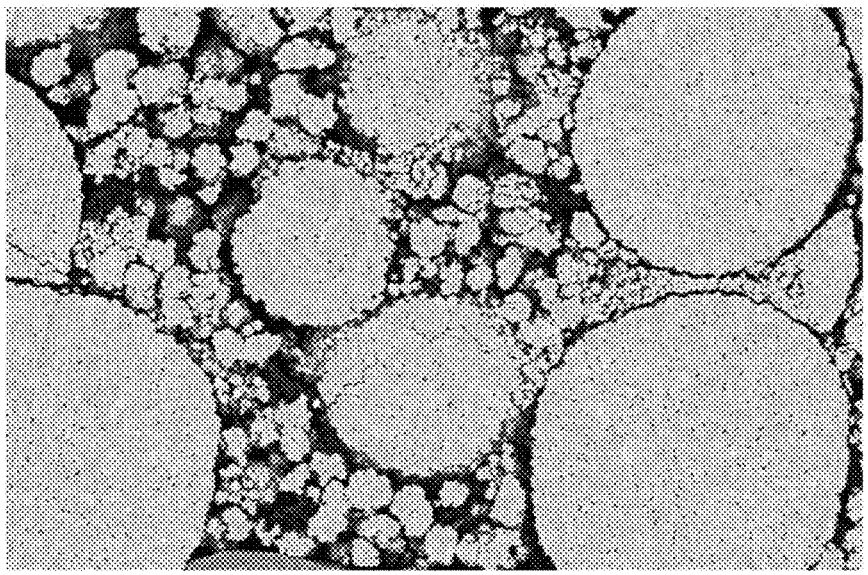
FIGS. 7 and 8 are scanning electron microscope images respectively showing cross-sections of cathodes after cycles of charging and discharging of the lithium batteries of Manufacturing Examples 9 and 11.
Figure 8:
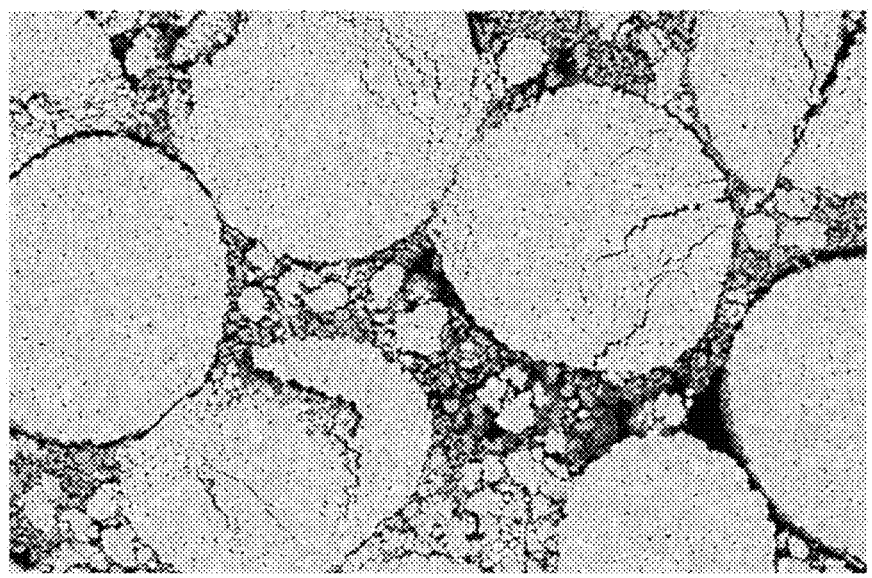

FIGS. 7 and 8 are electron scanning microscope images respectively showing cross-sections of cathodes after a cycle of charging and discharging of the lithium batteries of Manufacture Examples 9 and 11. A capacity retention at the $202^{th}$ cycle and an initial charge and discharge efficiency at the $1^{st}$ cycle are defined by Equations 3 and 4 below. In addition, a discharge capacity at the $2^{nd}$ cycle was determined as a standard capacity.

Capacity retention=(discharge capacity at $202^{th}$ cycle/discharge capacity at $3^{rd}$ cycle)×100%   Equation 3

Initial efficiency (%)=(discharge capacity at $1^{st}$ cycle/charge capacity at $1^{st}$ cycle)×100%   Equation 4

TABLE 6

| Classification | Discharge capacity at $1^{st}$ cycle (mAh) | Initial efficiency (%) | Standard capacity (mAh) | Capacity retention (%) |
| --- | --- | --- | --- | --- |
| Manufacture Example 9 | 492 | 87.4 | 490 | 88.8 |
| Manufacture Example 11 | 499 | 88.6 | 494 | 89.9 |

As shown in Table 6, the lithium battery of Manufacture Example 11 further including LiFePO$_4$ exhibited enhanced initial discharge capacity, enhanced initial charge and discharge efficiency, enhanced standard capacity, and an enhanced capacity retention, as compared to those of the lithium battery of Manufacture Example 11.

Evaluation Example 7: Direct Current Resistance ("DC-IR") Evaluation at Room Temperature (25° C.) (Evaluation of Effect of Addition of LFP 5%)

Initial DC-IR of each of the lithium batteries of Manufacture Example 9 and 11 was measured at room temperature (25° C.) using the following method.

At the $1^{st}$ cycle, each lithium battery was charged at a current of 0.5 C until the voltage reached 50% state of charge ("SOC") and cut off at 0.02 C, and then each lithium battery was left to rest for 10 minutes. Subsequently, each lithium battery was subjected to the following processes: discharging at a constant current of 0.5 C for 30 seconds, followed by resting for 30 seconds, and charging at a constant current of 0.5 C for 30 seconds, followed by resting for 10 minutes; discharging at a constant current of 1 C for 30 seconds, followed by resting for 30 seconds, and charging at a constant current of 0.5 C for 1 minute, followed by resting for 10 minutes; discharging at a constant current of 2 C for 30 seconds, followed by resting for 30 seconds, and charging at a constant current of 0.5 C for 2 minutes, followed by resting for 10 minutes; discharging at a constant current of 3 C for 30 seconds, followed by resting for 30 seconds, and charging at a constant current of 0.5 C for 3 minutes, followed by resting for 10 minutes.

An average voltage drop value for 30 seconds at each C-rate is a direct current voltage value. Direct current resistances calculated from the measured direct current voltages are shown in Table 7 below.

TABLE 7

| Classification | Initial Direct Current Resistance (milliohms (mΩ)) |
|---|---|
| Manufacture Example 9 | 126 |
| Manufacture Example 11 | 122 |

As shown in Table 7, the lithium battery of Manufacture Example 11 further including LiFePO$_4$ (LFP) exhibited reduced initial direct current resistance, as compared to that of the lithium battery of Manufacture Example 9.

As is apparent from the foregoing description, a composite cathode active material according to an embodiment has a grain boundary between a plurality of primary particles, which includes the lithium metal oxide of Formula 1 above, and includes, on a surface of a secondary particle, a coating film including Co oxide and a Group 2 element oxide, a Group 12 element oxide, a Group 13 element oxide, or a combination thereof, and a lithium battery including the composite cathode active material exhibits enhanced capacity and lifespan characteristics.

It should be understood that embodiments described herein should be considered in a descriptive sense only and not for purposes of limitation. Descriptions of features or aspects within each embodiment should be considered as available for other similar features or aspects in other embodiments.

While an embodiment has been described with reference to the figures, it will be understood by those of ordinary skill in the art that various changes in form and details may be made therein without departing from the spirit and scope as defined by the following claims.

What is claimed is:

1. A composite cathode active material comprising:
a secondary particle;
a coating on a surface of the secondary particle,
wherein the secondary particle comprises a plurality of primary particles, and
wherein the plurality of primary particles comprise a lithium nickel transition metal oxide having a layered crystal structure; and
a grain boundary between primary particles of the plurality of primary particles, the grain boundary comprising a lithium metal oxide having a crystal structure different from the lithium nickel transition metal oxide having a layered crystal structure and represented by Formula 1,
wherein the coating on the surface of the secondary particle comprises
a metal oxide including cobalt, and a Group 2 element, a Group 12 element, a Group 13 element, or a combination thereof, $$Li_aM1_bO_c \qquad \text{Formula 1}$$

wherein, in Formula 1, M1 is zirconium, manganese, silicon, molybdenum, palladium, cobalt, nickel, titanium, tin, iridium, platinum, aluminum, ruthenium, or a combination thereof, and
wherein 1.9≤a≤4, 0.9≤b≤1.1, and 2.9≤c≤4.

2. The composite cathode active material of claim 1, wherein the lithium metal oxide represented by Formula 1 has a monoclinic crystal structure.

3. The composite cathode active material of claim 1, wherein the lithium metal oxide represented by Formula 1 comprises Li$_2$ZrO$_3$, Li$_2$TiO$_3$, Li$_4$SiO$_4$, Li$_2$SiO$_3$, or a combination thereof.

4. The composite cathode active material of claim 1, wherein the metal oxide comprising cobalt, and the at least one selected from a Group 2 element, a Group 12 element, a Group 13 element, or a combination thereof comprises a first metal oxide having a spinel structure, a second metal oxide having a layered structure, or a combination thereof.

5. The composite cathode active material of claim 1, wherein the metal oxide comprising cobalt is a metal oxide represented by Formula 2:

$$Li_xCo_aMe_bO_c \qquad \text{Formula 2}$$

wherein, in Formula 2, Me is a Group 2 element, a Group 12 element, and a Group 13 element, or a combination thereof, and
0≤x≤1.1, 0<a≤3, 0<b≤3, and 1≤c≤4.1.

6. The composite cathode active material of claim 1, wherein the metal oxide comprising cobalt, and the at least one selected from a Group 2 element, a Group 12 element, a Group 13 element, or a combination thereof comprises a combination of i) at least one of Co$_3$O$_4$ and Li$_x$CoO$_2$ wherein 0<x≤1.5, and ii) MgO.

7. The composite cathode active material of claim 1, wherein the metal oxide comprising cobalt, and the at least one selected from a Group 2 element, a Group 12 element, a Group 13 element, or a combination thereof comprises a mixture of Co$_3$O$_4$ and MgO, a Co$_3$O$_4$.MgO composite, a mixture of LiCoO$_2$ and MgO, a LiCoO$_2$.MgO composite, a mixture of LiCoO$_2$, Co$_3$O$_4$, and MgO, or a LiCoO$_2$.Co$_3$O$_4$.MgO composite.

8. The composite cathode active material of claim 1, wherein a concentration of the Co and the Group 2 element, Group 12 element, Group 13 element, or combination thereof in the coating is greater than a concentration of the Co and the Group 2 element, Group 12 element, Group 13 element, or combination thereof in the secondary particle.

9. The composite cathode active material of claim 1, wherein, in the coating, a concentration of the Co and the Group 2 element, Group 12 element, Group 13 element, or a combination thereof increases in a direction away from the surface of the secondary particle.

10. The composite cathode active material of claim 1, wherein the metal oxide comprises Li$_x$Co$_a$Mg$_b$O$_4$, Li$_x$Co$_a$Ga$_b$O$_4$, Li$_x$Co$_a$Ca$_b$O$_4$, Li$_x$Co$_a$Ba$_b$O$_4$, Li$_x$Co$_a$Al$_b$O$_4$, or Li$_x$Co$_a$Zn$_b$O$_4$, wherein 1≤x≤1.1, 0<a<2, 0<b<2, and 0<a+b≤2.

11. The composite cathode active material of claim 1, wherein a particle comprising the lithium nickel transition metal oxide having a layered crystal structure comprises MgAl$_2$O$_4$.

12. The composite cathode active material of claim 1,
wherein the lithium nickel transition metal oxide having a layered crystal structure has a rock-salt layered crystal structure and belongs to an R-3m space group, and
wherein the metal oxide of the coating is a lithium cobalt composite oxide, and the lithium cobalt composite oxide belongs to an Fd-3m space group.

13. The composite cathode active material of claim 1, wherein the coating has a thickness of 1 micrometer or less.

14. The composite cathode active material of claim 1, wherein the lithium nickel transition metal oxide having a layered crystal structure comprises Al, Zr, or a combination thereof.

15. The composite cathode active material of claim 1, wherein the lithium nickel transition metal oxide having a layered crystal structure is represented by Formula 3:

$$Li_aM2O_{2-\alpha}X_\alpha \quad \text{Formula 3}$$

wherein, in Formula 3, 0.9≤a≤1.1, 0≤α<2, and M2 comprises nickel and at least two elements of Groups 2 to 13 except for Ni, X is F, Cl, Br, S, or P, and a nickel content in M2 ranges from about 70 mole percent to less than about 100 mole percent, based on a total content of M2.

16. The composite cathode active material of claim 1, wherein the lithium nickel transition metal oxide having a layered crystal structure is represented by Formula 4 below:

$$Li_aNi_bM2_cM3_dM4_eO_{2-\alpha}X_\alpha \quad \text{Formula 4}$$

wherein, in Formula 4, 0.9≤a≤1.1, 0.7<b<1, 0<c<0.3, 0<d<0.3, 0≤e<0.1, b+c+d+e=1, and 0≤α<2, M2, M3, and M4 are different from one another and are each independently Co, Mn, Al, Zr, Re, V, Cr, Fe, B, Ru, Ti, Nb, Mo, Mg, or Pt, and X is F, Cl, Br, S, or P.

17. The composite cathode active material of claim 1, wherein the lithium nickel transition metal oxide having a layered crystal structure is a compound represented by Formula 5, a compound represented by Formula 6, or a combination thereof:

$$Li_aNi_bCO_cMn_dM5_eO_{2-\alpha}X_\alpha, \quad \text{Formula 5}$$

$$Li_aNi_bCO_cAl_dM5_eO_{2-\alpha}X_\alpha \quad \text{Formula 6}$$

wherein, in Formulae 5 and 6, a, b, c, d, and e, are each independently 0.9≤a≤1.1, 0.7<b<1, 0<c<0.1, 0<d<0.1, 0≤e<0.01, b+c+d+e=1, and 0≤α<2, M5 in Formulae 5 and 6 are each independently Zr, Al, V, Cr, Fe, Re, B, Ru, Ti, Nb, Mo, Mg, or Pt, and X is F, Cl, Br, S, or P.

18. The composite cathode active material of claim 1, wherein the lithium nickel transition metal oxide having a layered crystal structure is represented by Formula 7:

$$aLi_2MnO_3 \cdot (1-a)LiM_6O_{2-\alpha}X_\alpha \quad \text{Formula 7}$$

wherein, in Formula 7, 0<a<1 and 0≤a<2, $M_6$ comprises

Ni and

Co, Mn, Zr, Al, Re, V, Cr, Fe, B, Ru, Ti, Nb, Mo, Mg, Pt, or a combination thereof, and X is F, Cl, Br, S, or P.

19. The composite cathode active material of claim 1, wherein the secondary particle comprising the lithium nickel transition metal oxide having a layered crystal structure has a mean particle diameter of about 10 micrometers to about 20 micrometers.

20. The composite cathode active material of claim 1, wherein the lithium nickel transition metal oxide having a layered crystal structure is a compound represented by Formula 8 or 9:

$$Li_xNi_{1-y-z}Mn_zCo_yO_2 \quad \text{Formula 8}$$

wherein, in Formula 8, 0.8≤x≤1.1, 0≤y≤0.2, 0≤z≤0.2, and 0.8≤1-y-z≤0.99, $$Li_xNi_{1-y-z}Al_zCo_yO_2 \quad \text{Formula 9}$$

wherein, in Formula 9, 0.8≤x≤1.1, 0≤y≤0.2, 0≤z≤0.2, and 0.8≤1-y-z≤0.99.

21. The composite cathode active material of claim 1, wherein a total amount of the metal oxide in the coating is in a range of about 0.01 parts by weight to about 20 parts by weight, with respect to 100 parts by weight of the lithium nickel transition metal oxide having a layered crystal structure.

22. The composite cathode active material of claim 1, wherein:

an amount of residual lithium in the composite cathode active material is 2,000 parts per million or less by weight, based on a total weight of the composite cathode active material, and the residual lithium in the composite cathode active material is on the surface of the secondary particle and not in the coating.

23. The composite cathode active material of claim 1, wherein:

an amount of residual lithium in the composite cathode active material is 90 weight percent or less of an amount of residual lithium in the secondary particle comprising the lithium nickel transition metal oxide having a layered crystal structure, the residual lithium in the composite cathode active material is on the surface of the secondary particle and not in the coating, and the residual lithium in the secondary particle comprising the lithium nickel transition metal oxide having a layered crystal structure is not in the lithium metal oxide having a crystal structure different from the lithium nickel transition metal oxide having a layered crystal structure.

24. The composite cathode active material of claim 1, wherein the coating covers 50 percent or greater of a total surface of the lithium nickel transition metal oxide having a layered crystal structure.

25. A cathode comprising the composite cathode active material of claim 1.

26. The cathode of claim 25, wherein the cathode further comprises a cathode active material having an olivine-type structure.

27. The cathode of claim 25, wherein the cathode active material having an olivine-type structure is represented by Formula 10:

$$Li_xM_yM'_{1-y}PO_4 \quad \text{Formula 10}$$

wherein, in Formula 10, 0.1≤x≤2, 0≤y≤1, and M and M' are each independently iron, titanium, vanadium, manganese, chromium, cobalt, nickel, copper, or zinc.

28. The cathode of claim 26, wherein an amount of the cathode active material having an olivine-type structure is 10 parts by weight or less, with respect to 100 parts by weight of a total weight of the cathode active material.

29. A lithium battery comprising:

the cathode of claim 25;

an anode; and an electrolyte between the cathode and the anode.

* * * * *